United States Patent
Matlock et al.

(10) Patent No.: US 12,094,105 B2
(45) Date of Patent: Sep. 17, 2024

(54) SYSTEM AND METHOD FOR AUTOMATIC LABELING OF PATHOLOGY IMAGES

(71) Applicants: datma, Inc., Beaverton, OR (US); PROVIDENCE HEALTH & SERVICES—OREGON, Portland, OR (US)

(72) Inventors: Kevin Lee Matlock, Portland, OR (US); Ganapati Srinivasa, Portland, OR (US); Carlo B. Bifulco, Portland, OR (US); Brian Donald Piening, Lake Oswego, OR (US)

(73) Assignees: datma, Inc., Beaverton, OR (US); Providence Health & Services, Portland, OR (US)

(*) Notice: Subject to any disclaimer, the term of this patent is extended or adjusted under 35 U.S.C. 154(b) by 540 days.

(21) Appl. No.: 16/895,401

(22) Filed: Jun. 8, 2020

(65) Prior Publication Data
US 2020/0388033 A1 Dec. 10, 2020

Related U.S. Application Data

(60) Provisional application No. 62/859,502, filed on Jun. 10, 2019.

(51) Int. Cl.
*G06T 7/00* (2017.01)
*G06F 18/2413* (2023.01)
*G06V 10/26* (2022.01)
*G06V 10/774* (2022.01)
(Continued)

(52) U.S. Cl.
CPC ........ *G06T 7/0012* (2013.01); *G06F 18/2413* (2023.01); *G06V 10/26* (2022.01); *G06V 10/774* (2022.01); *G06V 10/82* (2022.01); *G06V 20/698* (2022.01); *G06T 2207/10056* (2013.01);
(Continued)

(58) Field of Classification Search
CPC ........ G06T 7/0012; G06T 2207/30024; G06T 2207/20081; G06T 2207/10056; G06T 2207/20084; G06T 2207/30096; G06T 2210/41; G06T 7/00; G06V 20/698; G16H 50/20; G16H 50/30; G16H 10/40
See application file for complete search history.

(56) References Cited

U.S. PATENT DOCUMENTS 7,761,240 B2 *  7/2010  Saidi ............... G06V 20/695
                                                        382/128
8,269,827 B2 *  9/2012  Can ................. G01N 21/6428
                                                        382/128
(Continued)

FOREIGN PATENT DOCUMENTS

WO   WO-2017174267 A1 * 10/2017 ........... G06F 16/51
WO   WO-2018229052 A1 * 12/2018 ........... G01N 1/30

*Primary Examiner* — Aaron W Carter
*Assistant Examiner* — Courtney Joan Nelson
(74) *Attorney, Agent, or Firm* — Lee & Hayes P.C.

(57) ABSTRACT

Methods and systems are provided for automatically classifying cells in a histological stained image. In an example, a method includes automatically classifying a plurality of cells in an image of a biological sample stained with a histological stain using a classification model, the classification model trained with a plurality of automatically-classified pseudo-stained images each generated from a respective immunofluorescent image.

18 Claims, 12 Drawing Sheets
(8 of 12 Drawing Sheet(s) Filed in Color)

(51) Int. Cl.
    *G06V 10/82*     (2022.01)
    *G06V 20/69*     (2022.01)

(52) U.S. Cl.
    CPC ............... *G06T 2207/20081* (2013.01); *G06T 2207/30024* (2013.01); *G06T 2207/30096* (2013.01)

(56) References Cited

U.S. PATENT DOCUMENTS

2019/0028687 A1\*   1/2019   Tsai ........................... G06T 5/50
2020/0388029 A1\*  12/2020   Saltz .................... G06V 10/267

\* cited by examiner

SYSTEM AND METHOD FOR AUTOMATIC LABELING OF PATHOLOGY IMAGES

CROSS REFERENCE TO RELATED APPLICATIONS

The present application claims priority to U.S. Provisional Application No. 62/859,502, entitled "SYSTEM AND METHOD FOR AUTOMATIC LABELING OF PATHOLOGY IMAGES", and filed on Jun. 10, 2019. The entire contents of the above-listed application are hereby incorporated by reference for all purposes.

FIELD OF TECHNOLOGY

The present description relates generally to systems and methods for automatically labeling pathology images, and specifically to automatically labeling pathology images with cell classifications.

BACKGROUND

Tissues are biopsied for a variety of reasons including to diagnose the presence of a malignancy, track tumor growth or treatment effectiveness, or to identify immune cell infiltration into a tumor. Frequently, the biopsied tissue is sectioned, placed on a microscope slide, and stained with one or more dyes that may assist in visualizing and differentiating cellular structure. For example, with a hematoxylin and eosin stain (H&E stain), the hematoxylin stains acidic structures such as the cell nucleus, while the eosin stains basic structures, such as the cell cytoplasm and extracellular matrix. A pathologist may then analyze the stained slides under a bright field microscope to identify cell types, cell morphology, etc., which may help the pathologist to diagnose and/or classify a tumor or other patient condition. H&E and other common histological stains (e.g., methylene blue, Giemsa, and periodic acid-Schiff reaction) are inexpensive and easy to administer, and do not require sophisticated microscopy instruments to visualize the stained cells. Accordingly, these types of histological stains are widespread in diagnostic medical facilities world-wide.

While histological staining affords the benefits discussed above, one drawback of utilizing stained tissue samples to diagnose or monitor a patient is the reliance on the pathologist to visually analyze the stained tissue sample to distinguish between normal and pathological cell types. This process may be time-consuming and lead to pathologist fatigue, which may result in erroneous diagnoses. To this end, regulatory agencies may limit the number of slides a pathologist may analyze in a day, or limit the number of hours a pathologist may spend analyzing slides in a day. While these regulations may reduce the incidence of false positive or false negative diagnoses, the regulations may also extend the amount of time required to reach a diagnosis, which may negatively impact patient care. While other technologies are available to automatically classify cells to assist in diagnosing or monitoring a patient (such as immunofluorescence), such technologies are often expensive and/or technically complex, limiting the use of such technologies. There is therefore an unmet need for alternative methods of histological evaluation of biological samples.

SUMMARY

In one embodiment, a method includes automatically classifying a plurality of cells in an image of a biological sample stained with a histological stain using a classification model, the classification model trained with a plurality of automatically-classified pseudo stained images each generated from a respective immunofluorescent image.

In this way, a classification model may be used to automatically classify cells in an image of a biological sample (e.g., biopsied tissue) stained with a histological stain. The classification model may be trained with pseudo stained images generated from immunofluorescent images as well as associated classifications of each cell in the pseudo stained images. The cells in the pseudo stained images may be classified via the immunofluorescent images, which may undergo an automatic classification process (e.g., by a computing device). The classification model may be deployed locally at a medical facility (e.g., a clinic, a hospital, a diagnostic lab, or other medical environment) on the image, which may be obtained at the medical facility, or the image may be sent to a remote service that may deploy the classification model to classify the image remotely. By doing so, conventionally stained histological images may be automatically classified according to cell type, tumor status, tumor microenvironment, and so forth without relying on a pathologist to perform the classification.

To the accomplishment of the foregoing and related ends, certain illustrative aspects of the system are described herein in connection with the following description and the attached drawings. The features, functions, and advantages that have been discussed can be achieved independently in various embodiments of the present disclosure or may be combined in yet other embodiments, further details of which can be seen with reference to the following description and drawings. The summary is provided to introduce a selection of concepts in a simplified form that are further described below in the Detailed Description. This summary is not intended to identify key features or essential features of any subject matter described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
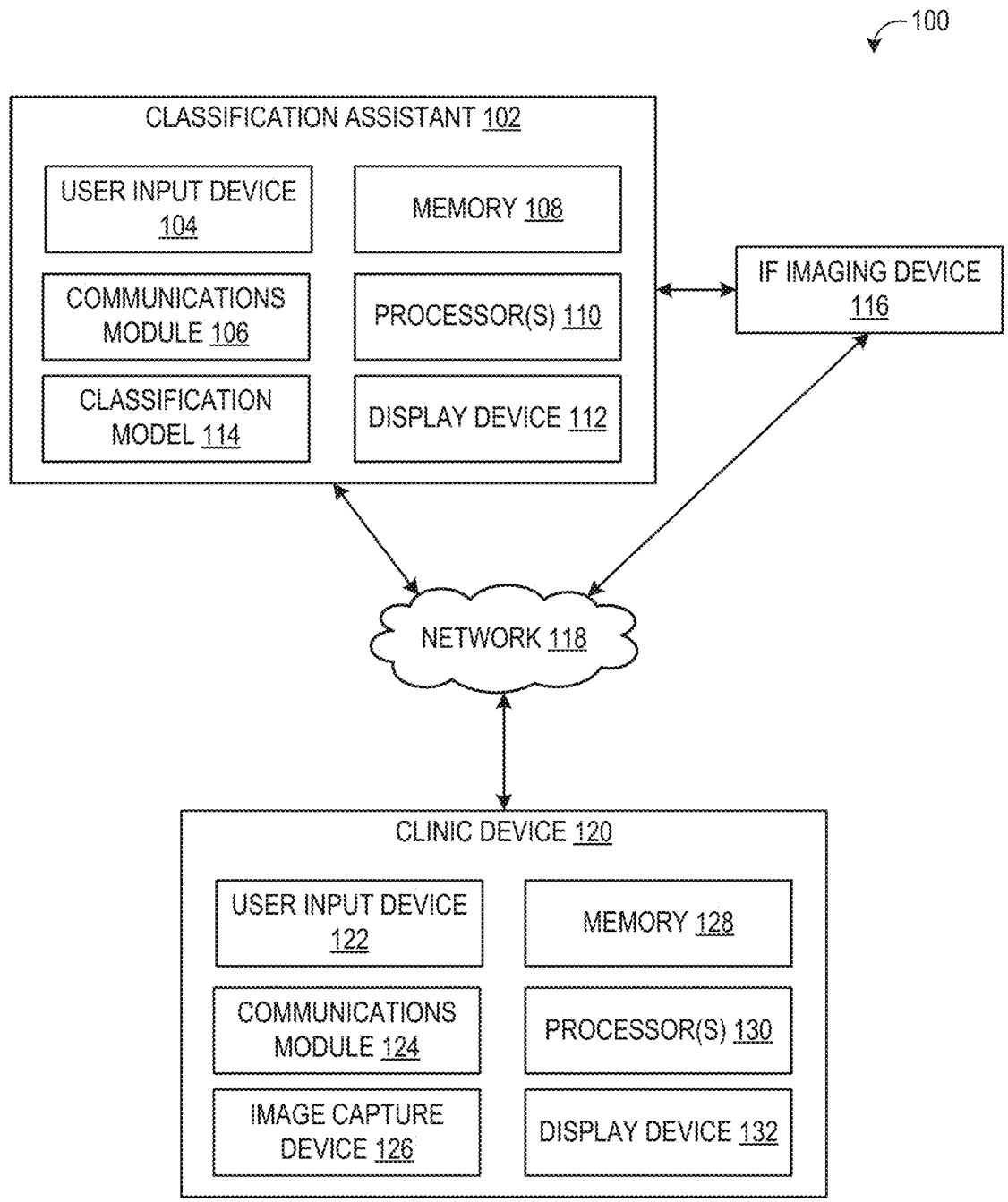
FIG. 1 schematically shows an exemplary cell classification system.

The following description relates to systems and methods for automatically classifying histological stained cells via a classification model that is trained using immunofluorescence-based cell classification. Immunofluorescence (IF) utilizes fluorophores attached to primary antibodies to fluorescently tag one or more target antigens (also referred to as biomarkers) that are present on and/or in cells of interest. Each primary antibody may be specific to a different biomarker, and each primary antibody facilitates the labeling of a biomarker with a fluorophore (whether directly or indirectly via a secondary antibody and/or an enzyme assisted reaction). When the fluorophores and primary antibodies are applied to tissue or other biological samples, the tissue may be viewed under a fluorescent microscope that is configured to excite each fluorophore. The signal intensity of each fluorophore may define a fluorescent signature for each cell that reflects the level (e.g., presence or absence) of each target biomarker. In some aspects, different biomarkers may be attached to different fluorophores, respectively, allowing a sample to be simultaneously tested for a plurality of biomarkers. In other aspects, samples may be tested for one biomarker at a time.

As different cells may exhibit different biomarker signatures, cell type, malignancy, or other features which may be useful as therapeutic targets may be identified based on the signal intensity level and/or distribution of the fluorophores. For example, normal lung cells may be differentiated from non-small cell lung cancer (NSCLC) cells based on expression of programmed cell death-ligand 1 (PD-L1), which may be overexpressed in NSCLC cells. Thus, if biopsied lung tissue is tagged with a fluorophore via an antibody against PD-L1, cells that have a higher than average signal intensity for that fluorophore may be identified as NSCLC cells. As another example, biopsied breast tissue may be tagged with a fluorophore via an antibody against HER2, and cells that have a relatively high signal intensity for that fluorophore may be identified as breast cancer cells that are likely to respond to anti-HER2 therapy. As non-limiting examples, other cells/tumor types that may be identified via biomarker expression include ovarian cancer (which may be identified based on expression of the biomarker CA-125) and cervical cancer (which may be identified based on expression of the biomarkers p16(INK4a)/Ki-67). Other biomarkers known to those of skill in the art may also be tagged with a fluorophore, including, but not limited to, those referenced in Polanski M, Anderson NL, 2007 (A list of candidate cancer biomarkers for targeted proteomics. Biomark Insights. 2007; 1:1-48. Published 2007 Feb. 7) and Kirwan, Alan & Utratna, Marta & O'Dwyer, Michael & Joshi, Lokesh & Kilcoyne, Michelle, 2015 (Glycosylation-Based Serum Biomarkers for Cancer Diagnostics and Prognostics. BioMed Research International. 2015. 10.1155/2015/490531), both of which are incorporated herein by reference.

IF allows for imaging of multiple different fluorophores both separately and simultaneously, which may increase the accuracy of cell classification. While IF imaging may provide for rapid and accurate classification of cells, IF utilizes complex protocols and requires sophisticated fluorescent microscopes, which are expensive. Thus, the use of IF imaging is typically limited to larger research or diagnostic facilities and is not widespread in medical or diagnostic facilities world-wide. Instead, standard pathology protocols for identifying tumor cells, for example, may rely on common histological stained slides of biopsied tissue (e.g., H&E, methylene blue, Giemsa), as these stains are simple to administer and utilize less sophisticated microscopes that may be relatively inexpensive. Additionally, IF imaging can require significant amounts of time, limiting the number of slides that may be imaged per day. However, classifying cells using histological stained tissue currently relies on visual inspection of the stained tissue by highly trained pathologists. Even with a high level of skill, there is a great deal of variability and subsequent issues of reproducibility in visually inspected slides. Further, as explained above, this process is time-consuming and may induce pathologist fatigue. Accordingly, it may be desirable to develop artificial intelligence based models that can automatically classify cells in images of histological stained tissue. However, training such models may be challenging as the amount of data that may be generated via pathologist inspection of histological stained tissue may be limited.

Thus, according to embodiments disclosed herein, a classification model that may automatically classify cells in histological stained tissue may be trained based on IF images of cells. The cells in the IF images may be automatically identified, extracted, and labeled by cell type/classification according to the signal intensity level of each of a plurality of fluorophores that are coupled to respective target biomarkers via selected primary antibodies. The antibodies may be selected based on a desired cell classification parameter (e.g., cancer cell classification, cell type classification, etc.) so that the target cells (e.g., normal versus cancer cells) may be differentiated/classified according to a displayed fluorophore signature that may be automatically identified (e.g., by a computing device). Once the cells within the IF images have been classified, the classified IF images may be converted to labeled pseudo histological stained images. The pseudo images may be generated by recoloring the IF images so that the images resemble traditional histological stain-based images. These pseudo images along with the associated classification of each cell as determined from the IF images may then be used to train the classification model. Once trained, the classification model may be deployed to automatically classify cells in standard, non-pseudo histological stained tissue.

FIG. 1 illustrates several components of an exemplary classification system 100 in accordance with an embodiment of the present disclosure. Collectively, the various tangible components or a subset of the tangible components may be referred to herein as "logic" configured or adapted in a particular way, for example as logic configured or adapted with particular software or firmware. In some aspects, logic and memory may be integrated into one or more common devices, such as an application specific integrated circuit or a system on a chip.

System 100 may be configured to execute one or more machine-readable instructions that are part of one or more applications, services, programs, routines, libraries, objects, components, data structures, or other logical constructions. Such instructions may be implemented to perform a task, implement a data type, transform the state of one or more devices, or otherwise arrive at a desired result. System 100 may include one or more processors (described below) that are configured to execute software instructions. Additionally or alternatively, the logic subsystem may include one or more hardware or firmware logic machines configured to execute hardware or firmware instructions.

Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

System 100 includes a classification assistant 102 in communication with one or more clinic devices, such as a clinic device 120, via a network 118. Classification assistant 102 includes resources (e.g., memory 108, processor(s) 110) that may be allocated to store and execute a classification model 114 that is configured to automatically classify cells in images of histological stained tissue or other biological samples. As used herein "histological stain" may refer to virtually any stain that may be used to assist in visualization of cells, extracellular matrix, or other biological structures. Examples of histological stains may include acidic/basic stains (such as hematoxylin, eosin, methylene blue, and aniline blue), periodic acid-Schiff (PAS) stain, Masson's trichrome stain, Azan, and Giemsa, which may all be visualized using common, bright field microscopes. In some examples, the histological stains may include immunohistological stains, such as peroxidase based stains (e.g., where the peroxidase is conjugated to a secondary antibody). Classification assistant 102 may be in communication with an imaging device 116 through a wired or wireless connection, for example through a network such as network 118. In some aspects, all or part of the classification assistant 102 may be part of the imaging device 116 or the clinic device 120.

As will be explained in more detail below, classification model 114 may be a deep learning model (e.g., machine learning or other deep learning model such as neural networking) that is trained to classify cells in the images of the stained biological samples. Classification model 114 may be trained to classify the cells as normal cells or pathological cells (e.g., tumor cells), classify the cells based on cell type (e.g., cytotoxic T cells, macrophages), and/or classify the cells based on other cell parameters, such as probable therapeutic targets (e.g., whether the cells are likely or not likely to respond to a certain therapy). In some examples, the automated cell type detection described herein may also facilitate the recognition of tissue structures, such as capillaries/vasculature, tumor invasive margins, tumor budding, neural bundles etc., and thus models may be trained to specifically recognize these tissue structures. Additional example cell types the model may detect are provided in Table1 (discussed below), including such cells as Neutrophils, B cells, and perycites.

Classification assistant 102 may be configured to deploy classification model 114 locally, and/or classification assistant 102 may be configured to maintain a global version of classification model 114 that, upon request, may be sent to one or more clinic devices (such as clinic device 120) where the classification model may be stored and executed by the respective clinic device. When configured to execute classification model 114 locally, classification assistant 102 may receive an image of histological stained tissue (e.g., acquired with an image capture device associated with a medical or other diagnostic facility, such as image capture device 126) that includes tissue or other biopsied material (e.g., blood) from a patient, and enter the image into classification model 114. Classification model 114 may then output an indication of classified cells present in the stained tissue. For example, classification model 114 may output a labeled image, which may include the original received image that has been annotated with labels indicating the classification for each cell the model was able to identify/classify. The labeled image may be output for display (e.g., via display device 112) and/or saved in memory (e.g., on memory 108 and/or in an alternate memory, such as in an electronic medical record of the patient from which the sample was obtained and/or the labeled image may be sent back to the device that sent the original image of the stained tissue).

In examples where classification model 114 is deployed on one or more remote devices (such as clinic device 120), a version of classification model 114 may be stored and executed on the remote device (e.g., stored in the memory 128 and executed by processor(s) 130), and the remotely-stored classification model may output a labeled image in response to receiving an image of histological stained tissue, similar to the process described above. In such examples, the clinic device may obtain an image of the stained tissue from an associated image capture device (e.g., image capture device 126), and the image may then be entered into the classification model and/or the clinic device may retrieve an image of a histological stained slide from memory and enter the retrieved image into the classification model. The labeled image that is output by the classification model may be stored in the memory of the clinic device, output for display on a display device associated with the clinic device (e.g., display device 132), and/or stored in a relevant patient electronic medical record locally or at a remote storage location.

Classification model 114 may be trained to classify cells in histological stained tissue using training datasets that include automatically labeled pseudo stained images, where the pseudo stained images are the training input elements and the labels identifying the classification of the cells in the pseudo stained images are the associated training output elements. The pseudo stained images may be generated from immunofluorescent (IF) images of cells present in sampled/biopsied tissue or other anatomical material. The IF images may be obtained with an IF imaging device 116, which may be a fluorescent microscope configured with an image capture device. The IF imaging device may send IF images to the classification assistant 102 directly or via network 118 or other intermediary device. The cells in the IF images may be automatically labeled by the classification assistant 102 to reflect a classification of each identified cell, similar to the classification described above (e.g., normal versus tumor cells, cell type, etc.). In some aspects, the IF cells may be automatically labeled according to an immunofluorescent signature exhibited by each cell that reflects the expression levels of each of a plurality of biomarkers.

Classification assistant 102 includes a communications module 106 that facilitates transmission of electronic data within and/or among one or more systems. Communications module 106 may be configured to communicatively couple classification assistant 102 with one or more other computing devices via a network 118 (at least in some examples).

Such connections may include wired and/or wireless communication devices compatible with one or more different communication protocols on public/private or hybrid networks including, but not limited to, the Internet, a personal area network, a local area network (LAN), a wide area network (WAN) or a wireless local area network (WLAN) using any past, present, or future communication protocol (e.g., USB 2.0, USB 3.0, etc.). For example, wireless connections may be WiFi, (e.g., IEEE 802.11), Bluetooth®, and the like. In some examples, communication via communications module 106 occurs according to one or more standards (e.g., Digital Imaging and Communications in Medicine (DICOM), Health Level Seven (HL7), ANSI X12N, etc.). Example wired interfaces a data bus, a Universal Serial Bus (USB) connection, etc.

Memory 108 of classification assistant 102 may include one or more data storage structures, such as optical memory devices, magnetic memory devices, or solid-state memory devices, for storing programs and routines executed by processor(s) 110 to carry out various functionalities disclosed herein. Memory 108 may include any desired type of volatile and/or non-volatile memory such as, for example, static random access memory (SRAM), dynamic random access memory (DRAM), flash memory, read-only memory (ROM), etc. Processor(s) 110 may be any suitable processor, processing unit, or microprocessor, for example. Processor(s) 110 may be a multi-processor system, and, thus, may include one or more additional processors that are identical or similar to each other and that are communicatively coupled via an interconnection bus.

Aspects of the present disclosure are described herein with reference to flowchart illustrations and/or block diagrams of methods, apparatus, and computer program products according to the embodiments disclosed herein. Insofar as such block diagrams, flowcharts, and/or examples contain one or more functions and/or operations, it will be understood by those of skill in the art that each function and/or operation within such block diagrams, flowcharts, or examples can be implemented, individually and/or collectively, by computer readable instructions using a wide range of hardware, software, firmware, or virtually any combination thereof. In some aspects, several portions of the subject matter described herein may be implemented via Application Specific Integrated Circuits (ASICs), Field Programmable Gate Arrays (FPGAs, semiconductor devices based around a matrix of configurable logic blocks (CLBs), connected via programmable interconnects. Those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. In one aspect, these computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram blocks.

As used herein, the terms "system" or "module" may include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems" or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

One or more of the devices described herein may be implemented over a cloud or other computer network. For example, classification assistant 102 is shown in FIG. 1 as constituting a single entity, but it is to be understood that classification assistant 102 may be distributed across multiple devices, such as across multiple servers.

Display device 112 may be used to present a visual representation of data using, for example, a "Graphics processing unit" (GPU), a processing unit that comprises a programmable logic chip (processor) specialized for display functions. The GPU may render images, animations, and video for a computer screen. The GPU may be located on plug-in cards, in a chipset of a motherboard of a computer, or in the same chip as the central processing unit (CPU). The GPU may perform parallel operations on multiple sets of data, and thus may be used as vector processors for non-graphics applications which involve repetitive computations.

Additional devices described herein (e.g., clinic device 120) may likewise include user input devices (e.g., user input device 122), memory (e.g., memory 128), processors (e.g., processor(s) 130), and communication modules/interfaces (e.g., communications module 124) similar to communications module 106, memory 108, and processor(s) 110 described above, and thus the description of communications module 106, memory 108, and processor(s) 110 likewise applies to the other devices described herein. The user input devices (e.g., devices 104 and/or 122) may include keyboards, mice, styluses, touch screens, microphones, or other suitable devices.

As explained previously, histological evaluation of tumor tissue is used in oncology for both diagnosis and to drive treatment decisions. While rapid advances in cancer immunotherapies have created a need for more comprehensive evaluation of the tumor and its surrounding microenvironment, this is currently only performed in a limited, qualitative and manual fashion by the pathologist. The embodiments disclosed herein (e.g., the classification model described above) leverage the advancement of immunofluorescence imaging coupled with computational hardware and algorithms for rapid machine learning image analysis approaches to automatically characterize and quantify cell type in histological images. As will be explained in more detail below, the classification model utilizes uni- or multiplexed immunofluorescence or immunohistochemistry (mIF/IHC) images to generate a training set of labelled histological stained (e.g., H&E) images in a first stage of the classification process that are used to build a computational model in a second stage of the classification process that is used to predict cell types in a standard histological stained image in a third stage of the classification process.

The first stage of the classification process includes the development of a set of labelled histological images using IF images. High-dimensional multiplex immunofluorescence data is used to build a model for classification of simple standard-of-care histopathology (e.g., hematoxylin and eosin (H&E)) slides. Here, digitized microscopy images from nuclear DNA staining (4',6-diamidino-2-phenylindole (DAPI)) is passed through a segmentation algorithm to extract the nuclei of individual cells in the image. The segmentation algorithm is configurable and may be a machine learning or standard image processing algorithm. Each of these segmented cells are classified by cell type using additional labeled antibody markers for various tumor and immune cell types. This information is then converted into a pseudo-stained image resembling an H&E slide or other staining technique.

The cells within a multiplexed image are classified using the biomarkers present. The DAPI stained image is chosen for segmenting the cells due to its capability to highlight nuclei inside of cells. The DAPI stained images may be included within the Tagged Image File Format (TIFF) file provided by the IF imaging device. The segmentation algorithm may be either a traditional image processing algorithm such as Marker based Watershed Segmentation, the circular Hough transform, or maximally stable extremal regions as well as Machine Learning or Deep Learning based approached such as Region-based Convolutional Neural Networks (RCNNs) or U-Net.

Once the segmentation step is completed, each cell is classified iteratively based on the intensity of the remaining biomarkers. These intensity values may be calculated using either the average or median pixel intensity of each stain/fluorophore. This process may be fine-tuned heuristically using input from a pathologist and/or immunologist to calibrate the threshold.

The final step in the first stage is converting the IF images into a more conventional histological stained image. In some examples, a Convolutional Neural Network (CNN) may be trained to transform IF images into histological images by staining the IF images with one or more histological stains (e.g., H&E) after scanning and using the derived images from the training of the CNN. In other examples, the IF images may be converted to histological stained images using a re-colorization process available on suitable IF imaging devices.

The second stage includes training/tuning of algorithms to find an optimal model for classifying the images generated through the first stage. This may be done with a variety of Neural Network or traditional image processing approaches. Neural Network training strategies may be applied in this step, such as applying Transfer Learning using a pre-trained Neural Network architecture such as InceptionV3 with ImageNet weights, which may reduce the training time.

The third stage includes using the model from the second stage to predict cell types in regular (non-pseudo-colored) histological stained images. This may be of particular use to hospitals and clinics that lack the capabilities and equipment to perform more advanced imaging modalities and also lends itself to the generation of large classification datasets for further downstream computation. This technology may have significant utility in pathology departments worldwide as it can 1) replace the manual and semi-quantitative tumor cell counting currently performed during diagnosis by a pathologist and 2) it provides a metric for immune cell infiltration in the tumor that has been shown to be predictive for response to immunotherapy. Both of these advances may ultimately decrease healthcare costs and improve outcomes for cancer patients.

Figure 2:
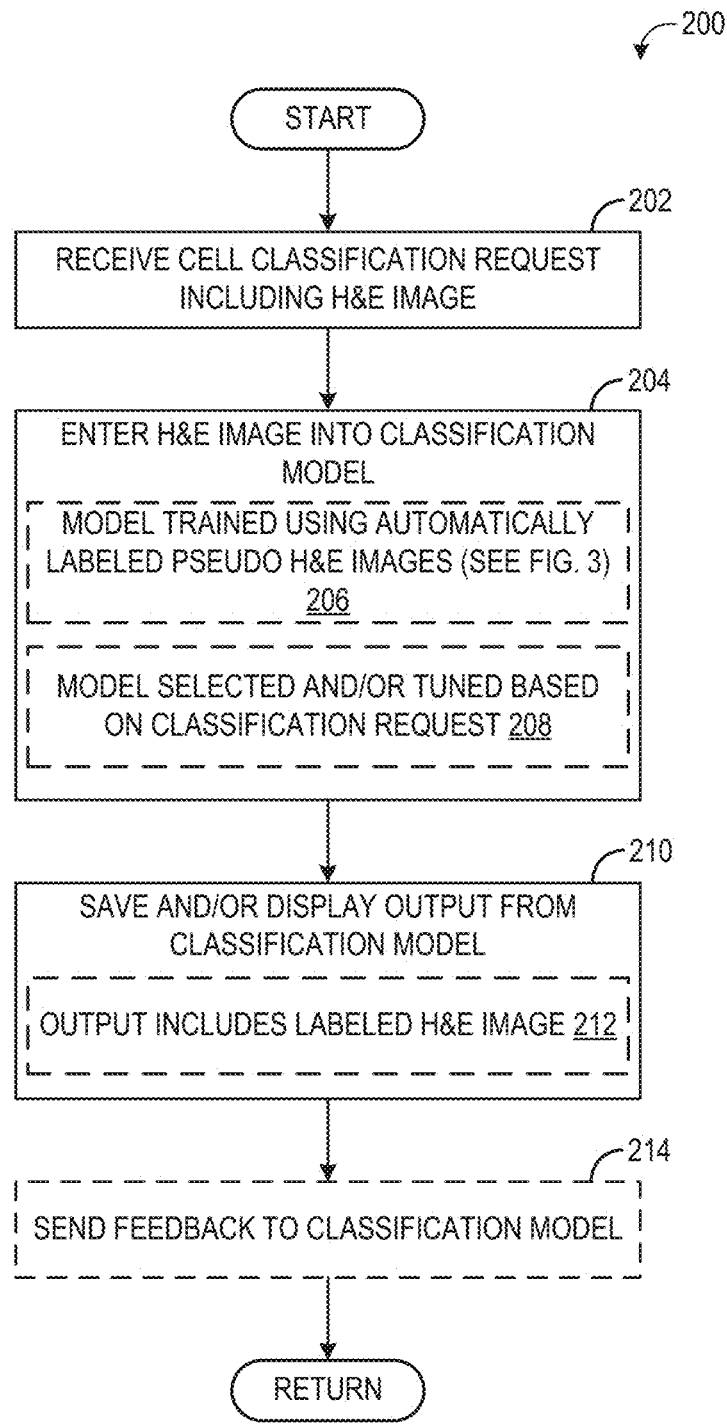
FIG. 2 is a flow chart illustrating an example method for automatically classifying cells in an image of a histological stained biological sample.

FIG. 2 is a flow chart illustrating a method 200 for automatically classifying a plurality of cells in an image of a biological sample stained with a histological stain. The method of FIG. 2 and the remaining methods described herein are specific to images of biological samples stained with H&E (referred to as H&E images). However, it will be appreciated that the methods described herein may likewise apply to other types of histological stain without departing from the scope of this disclosure. Method 200 may be executed by a processor of a computing device, such as clinic device 120 and/or classification assistant 102, according to instructions stored in non-transitory memory of the computing device.

At 202, a cell classification request may be received, where the classification request includes an H&E image. For example, a user may enter input (e.g., via a user input device, such as user input device 122) to the computing device requesting that the computing device automatically classify one or more cells present in the H&E image. The H&E image may be stored in memory of the computing device, or the computing device may obtain the H&E image from a remote storage location (e.g., in response to the user input). The classification request may include an indication of what type of classification is to be performed on the H&E image. Example types of classifications may include normal versus tumor cell classification, cell type classification, tissue classification, biomarker, or other classifications. Further, for normal versus tumor cell classification, the classification request may include an indication of the tumor type (e.g., non-small cell lung cancer, small cell lung cancer, breast cancer, colon cancer, etc.). The classification request may further include information about the biological sample, such as sample type (e.g., lung tissue, bone marrow, breast tissue, etc.), biopsy method, and/or patient information (e.g., age, prior indications). The classification request may further include a request to perform a quantitative analysis of the classified cells, such as counting the number of cells in each requested classification.

At 204, the H&E image is entered into a classification model. In some examples, the classification model may be stored and executed by the computing device. In other examples, the classification model may be stored and executed on a remote device, such as on a remote server. In such examples, the computing device may send the H&E image and information included in the classification request to the remote device, and the remote device may enter the H&E image into the classification model.

The classification model is configured to automatically identify cells in the H&E image (e.g., based on the presence of a nucleus in order to differentiate cells from extracellular matrix or other structures) and classify the identified cells, according to the classification type indicated in the classification request. As an example, the classification model may be configured to automatically classify the identified cells in the H&E image as tumor cells or non-tumor (e.g., normal) cells. The classification model may be an artificial intelligence based model, such as a deep learning model (e.g., a neural network-based model). As explained previously, while pathologists may visually analyze H&E images to classify the cells present in the images, manually classifying the cells is laborious and time-consuming. Thus, if pathologist-classified H&E images are used to train the classification model the amount of training datasets required to train the classification model may be difficult to produce and prone to inaccuracies stemming from the reliance on human analysis. Accordingly, while the classification model may be trained using pathologist-classified H&E images or a combination of automatically labeled pseudo H&E images and pathologist-classified H&E images, in some aspects, the classification model is trained using automatically labeled pseudo H&E images, as indicated at 206. While H& E images and pseudo H& E images are used for training in this example, other types of stains and pseudo stains including, but not limited to, methylene blue, Giemsa, and periodic acid-Schiff reaction, may also or alternatively be used for training. The pseudo H&E images or other pseudo stain images may be generated from immunofluorescent images of cells and automatically labeled according to biomarker signatures exhibited by the cells as determined via the immunofluorescent images. In this way, the biomarker expression of the cells, which may not be visible in the H&E stained tissue but may be automatically detected by a computing device, may be automatically correlated with cell morphological data that may mimic the cell morphology visible in the H&E stained tissue, which may then be used to train the classification model. Additional details about training the classification model are presented below with respect to FIG. 3.

Additionally, in some examples, an appropriate classification model deployed to perform the classification may be selected based on the information included in the classification request and/or the classification model may be tuned based on the information included in the classification request, as indicated at 208. For example, the classification request may include an indication to classify cells in lung tissue as either non-small cell lung cancer (NSCLC) cells or normal, non-cancerous lung cells. In response, the computing device may select a classification model specifically trained to classify NSCLC cells to perform the classification. In contrast, if the classification request includes an indication to classify cells in breast tissue as cancerous or non-cancerous cells, the computing device may select a classification model specifically trained to classify breast cancer cells to perform the classification. In other examples, only one classification model may be used, which may be trained to classify multiple different cell or cancer types, and the information from the classification request may be used as an input to the classification model.

At 210, the output from the classification model is saved and/or displayed via a display device operably coupled to the computing device (e.g., display device 112 or display device 132). The output from the classification model may include the H&E image that was entered into the classification model and the classification of the cells in the H&E image determined by the classification model. The classification of the cells may be represented in a suitable manner. For example, the output of the classification model may be a labeled H&E image, as indicated at 212, where each cell that was classified by the classification model is labeled with an annotation, in the H&E image, indicating the classification for that cell. For example, Scalable Vector Graphics (SVG) may be overlaid on a high-resolution microscopic image viewer hosted on a local computer or a centralized server. In addition, the identified/classified cell types may be counted and a more quantitative analysis of the histopathological images may be provided. For example, cell type quantification may be accomplished using either the median or mean intensity value of the biomarker signals inside a cell. These quantitative measurements may be performed on a region of interest (ROI) selected by a user or on a whole slide image. In another example, the cells in the H&E image may be labeled with the respective classification via coloration or highlighting (e.g., each cancer cell may be highlighted with a green border while each normal cell may be highlighted with a yellow border). Other mechanisms for representing the classification of each identified cell are possible without departing from the scope of this disclosure.

At 214, method 200 optionally includes sending feedback to the classification model. For example, a user (such as a pathologist) may analyze the output from the classification model (e.g., the labeled H&E image) and identify erroneous classifications (e.g., where a cell was labeled as being cancerous but the pathologist disagrees that the particular cell is a cancer cell), unidentified cells, or other issues. The user may enter the feedback to the computing device, which may then store the feedback and/or send the feedback to the remote device storing/executing the classification model. Once a threshold amount of feedback has been received, the classification model may be re-trained, which may improve the accuracy of the classification model over time. Further, in some examples, the feedback may be tagged with a user name (e.g., the specific pathologist that analyzed the output) and/or medical/diagnostic facility name, and then the classification model may be retrained in a user- and/or site-specific manner (e.g., a local version of the classification model executed on a clinic device of a medical facility may be updated only with feedback from that medical facility).

Figure 12:
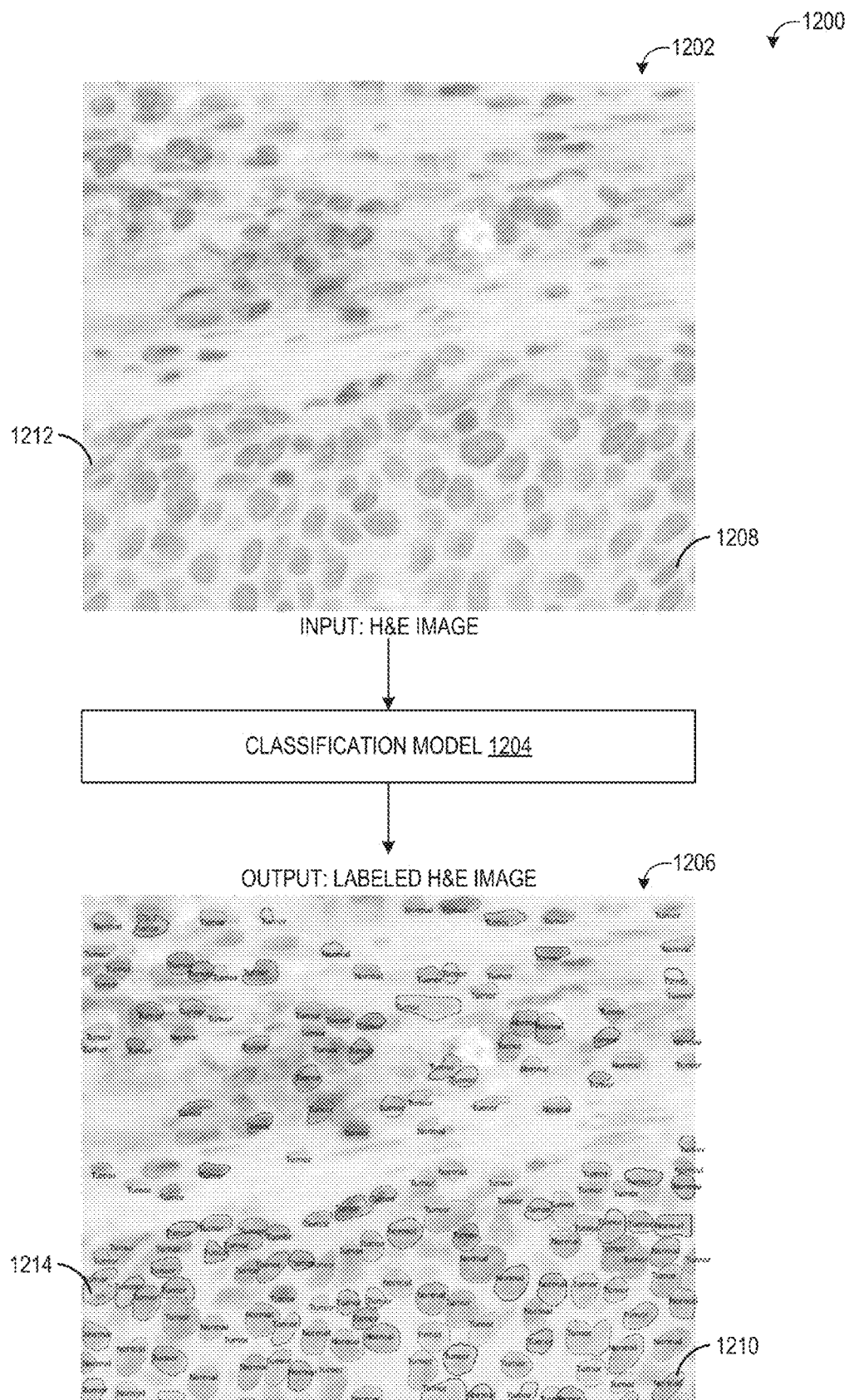
FIG. 12 shows an example process for classifying cells in an image of a histological stained biological sample, according to the method of FIG. 2.

FIG. 12 illustrates a classification process 1200 that includes the inputting of an H&E image 1202 into a classification model 1204, which outputs a labeled H&E image 1206. H&E image 1202 may be an image of a biological sample (e.g., biopsied tissue) that has been fixed, sectioned, placed on a microscope slide, and stained with a histological stain, which, in this example, is H&E. The H&E image may be obtained with an image capture device affixed to/included with a bright field microscope, such as image capture device 126. Due to the level of magnification and H&E staining, individual cells are visible in image 1202, such as first cell 1208 and second cell 1212, the nuclei of which are stained purple.

As explained above, the classification model 1204 utilizes the H&E image 1202 as input, such that the classification model identifies which structures in the H&E image 1202 are cells, and then the classification model classifies the identified cells. The classification model 1204 then outputs the determined classifications associated with each identified cell. As shown, the classification model 1204 outputs the labeled H&E image 1206. In the labeled H&E image 1206, each nucleus of each identified cell from the H&E image 1202 is outlined (e.g., such that the outline tracks the circumference/outer edges of the nucleus). Further, each identified cell is labeled with an annotation identifying the classification of that cell. For example, first cell 1208 (from the H&E image 1202) is annotated in labeled H&E image 1206 with a first label 1210 indicating that first cell 1208 is a normal cell. Second cell 1212 (from the H&E image 1202) is annotated in labeled H&E image 1206 with a second label 1214 indicating that second cell 1212 is a tumor cell.

Figure 3:
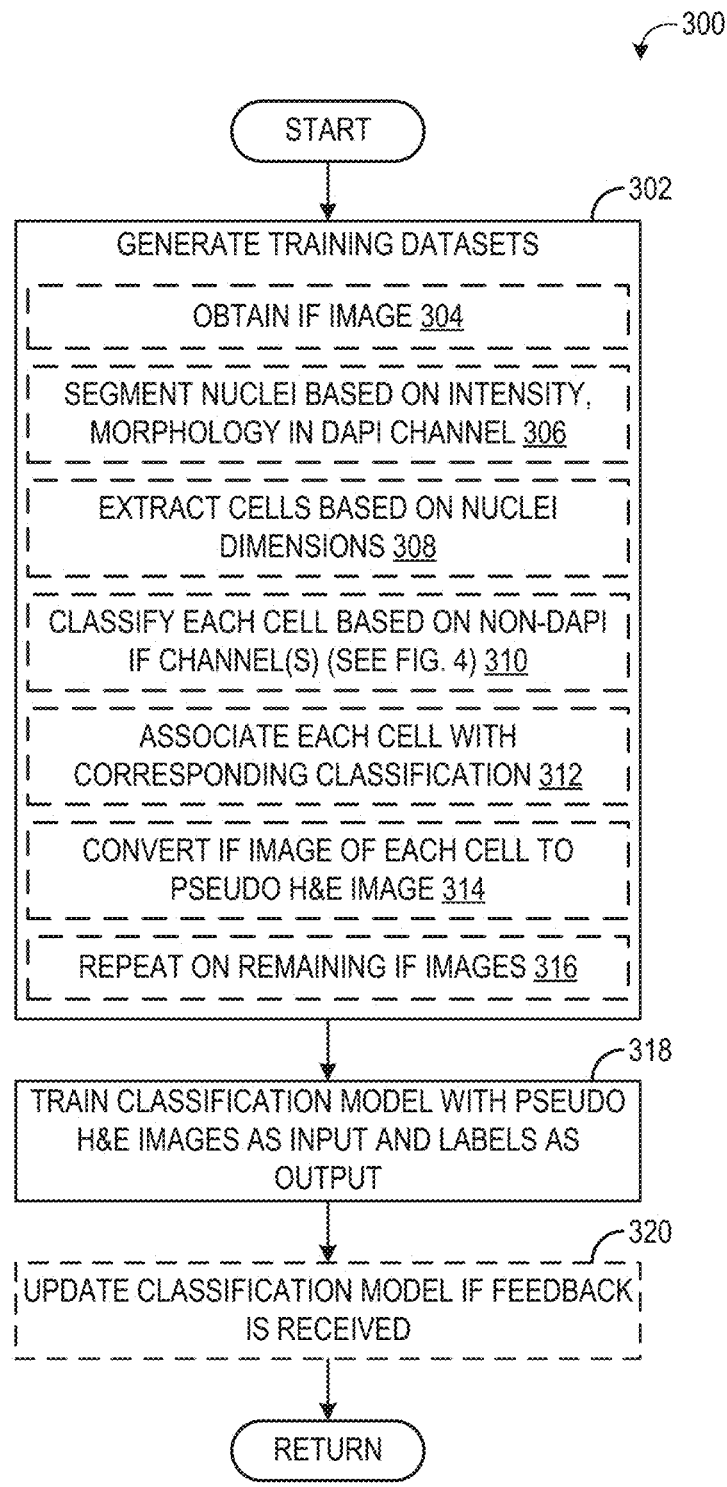
FIG. 3 is a flow chart illustrating an example method for training a classification model to automatically classify cells in an image of a histological stained biological sample.

FIG. 3 is a flow chart illustrating a method 300 for training a classification model. Method 300 may be executed by a processor of a computing device, such as classification assistant 102, according to instructions stored in non-transitory memory of the computing device. Classification model 114 of FIG. 1 is an example of a classification model that may be trained according to the method 300 of FIG. 3. Likewise, the classification model deployed to classify the cells according to the method 200 of FIG. 2 may be trained according to the method 300 of FIG. 3.

At 302, training datasets are generated. As explained above, the training datasets used to train the classification model include pseudo stained images generated from immunofluorescent images and corresponding cell classifications of each identified cell in the pseudo stained images. Accordingly, generating a training dataset includes, at 304, obtaining an immunofluorescent (IF) image. The IF image may be acquired with an image capture device affixed to/included in a fluorescent microscope, such as IF imaging device 116. The IF image may be an image of a biological sample (e.g., biopsied tissue) that has been incubated with antibodies that facilitate association of various fluorophores with target biomarkers expressed in and/or on the cells in the biological sample. When the fluorophores are excited by the fluorescent microscope, the fluorophores emit light that is then captured in the IF image. The biological sample may be incubated with one or more antibodies as well as 4',6-diamidino-2-phenylindole (DAPI), which is a fluorescent stain that binds DNA and hence marks the nucleus of each (non-red blood) cell in the biological sample. The antibodies may include primary antibodies directly tagged with the fluorophores, primary antibodies configured to bind with secondary antibodies that are tagged with the fluorophores, or primary antibodies configured to bind with secondary antibodies that include an enzyme (e.g., horseradish peroxidase) configured to catalyze a fluorophore compound (e.g., tyramide) to activate the fluorophore so that it covalently binds to electron rich regions, such as tyrosine residues, present on the surface or in the vicinity of the biomarker.

The biological sample may be incubated with a suitable mix (also referred to as a panel) of primary antibodies, with each antibody raised against a specific biomarker. The specific panel of primary antibodies may be selected to in order to facilitate classification of one or more cell types. For example, to classify normal cells versus tumor cells, the antibodies in the panel may include antibodies to TP53, CK7, CK20, and Ki67. To classify cytotoxic T cells, the panel may include antibodies to CD8 and CD45, CD25, and CD69, while to classify helper T cells, the panel may include antibodies to B7, CD3, CD4, CD28, and CD45. Each target biomarker may be tagged (via the appropriate primary antibody) with a different fluorophore so that each different biomarker will be stained/emit a different wavelength of light upon excitation (via the fluorophore with which the biomarker is tagged). In this way, if a cell is expressing the biomarker that an antibody has been raised against, the antibody will bind to the biomarker, and the tag will fluoresce and visually label the cell. Each different fluorophore may be excited one-by-one (e.g., by changing the excitation channel and/or the imaging filter of the microscope), and an image may be captured at each channel/excitation wavelength. The images taken at each channel/excitation wavelength may then be overlaid on each other to generate the IF image. In other examples, the different fluorophores may be excited simultaneously, and one IF image may be captured. In such examples, the IF imaging device may be capable of separating out the signal from each different type of fluorophore to enable separate signal intensity analysis for each biomarker, as explained below. Further, as used herein, an IF image may refer to an image captured at an earlier time and stored in memory of a computing device, or an IF image may refer to real-time visualization/analysis of IF stained cells by a fluorescent microscope, where the nuclei segmentation, cell extraction, and cell classification (as described below) is performed with or without an actual IF image being captured and stored in permanent memory.

Figure 5:
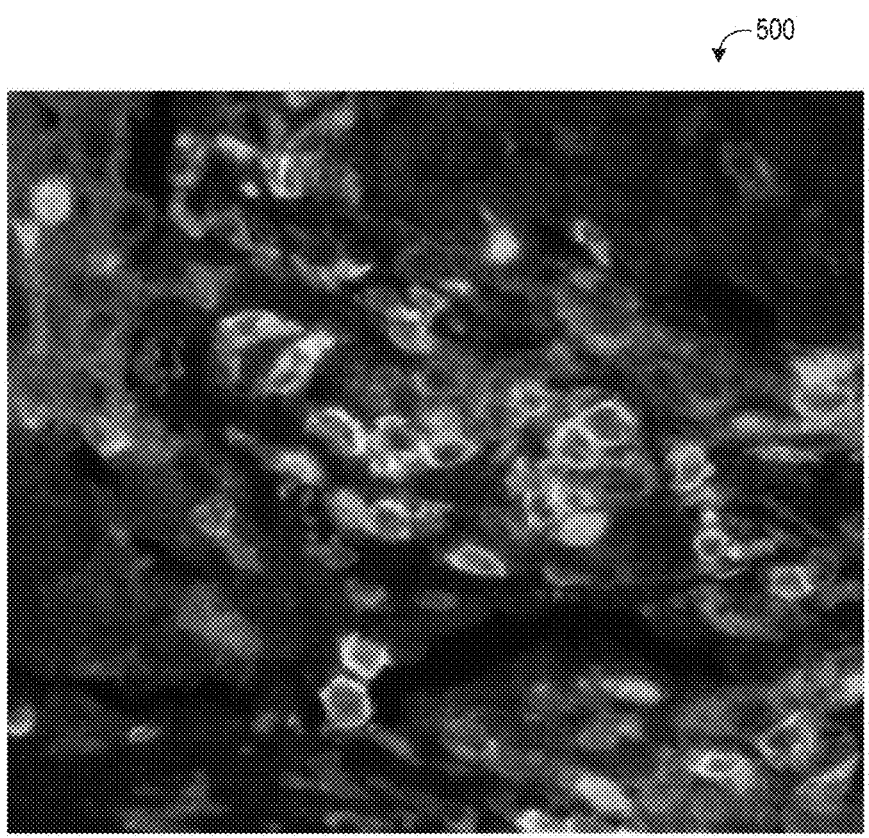
FIG. 5 is an example IF image of a biological sample.

FIG. 5 shows an example IF image 500 acquired with an IF imaging device. IF image 500 is an image of a biological sample, such as biopsied tissue, that has been stained with fluorophores using a suitable panel of primary antibodies, in order to label a set of target biomarkers. In the example shown in FIG. 5, the biological sample has been incubated with a panel of primary antibody-fluorophore pairs which express in different wavelengths including red, green, yellow, magenta, purple, and orange fluorophores used to tag, via respective primary antibodies, the biomarkers CD163, cytokeratin, CD3, CD8, FoxP3, and PDL1 respectively, along with a DAPI counterstain (blue) to highlight nucleic regions, with each antibody facilitating labeling of the corresponding biomarker with a different fluorophore. As appreciated by FIG. 5, the IF procedure allows the cells not only to be visualized, but also allows expression levels of the different biomarkers to be assessed. For example, some cells in FIG. 5 show a relatively high expression level of the biomarker CD3, as evidenced by the bright yellow staining, while other cells show a relatively low expression level of the biomarker CD3. The image in FIG. 5 was taken at 40× magnification. The classification model training described herein may generally classify images captured at magnifications in a range between 20× and 40× magnification though higher magnification may also be used. This range encompasses the microscopes commonly utilized in clinics. At magnification levels less than 20× there is a lack of sufficient detail to accurately distinguish cells.

Figure 6:
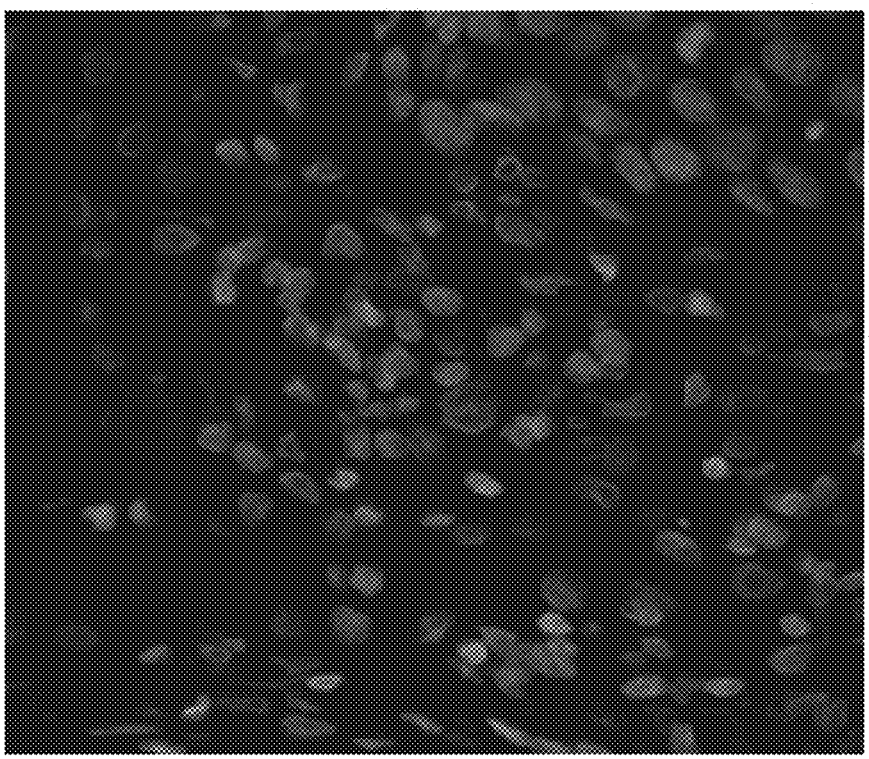
FIG. 6 is an example 4',6-diamidino-2-phenylindole (DAPI)-only image of the biological sample.
Figure 7:
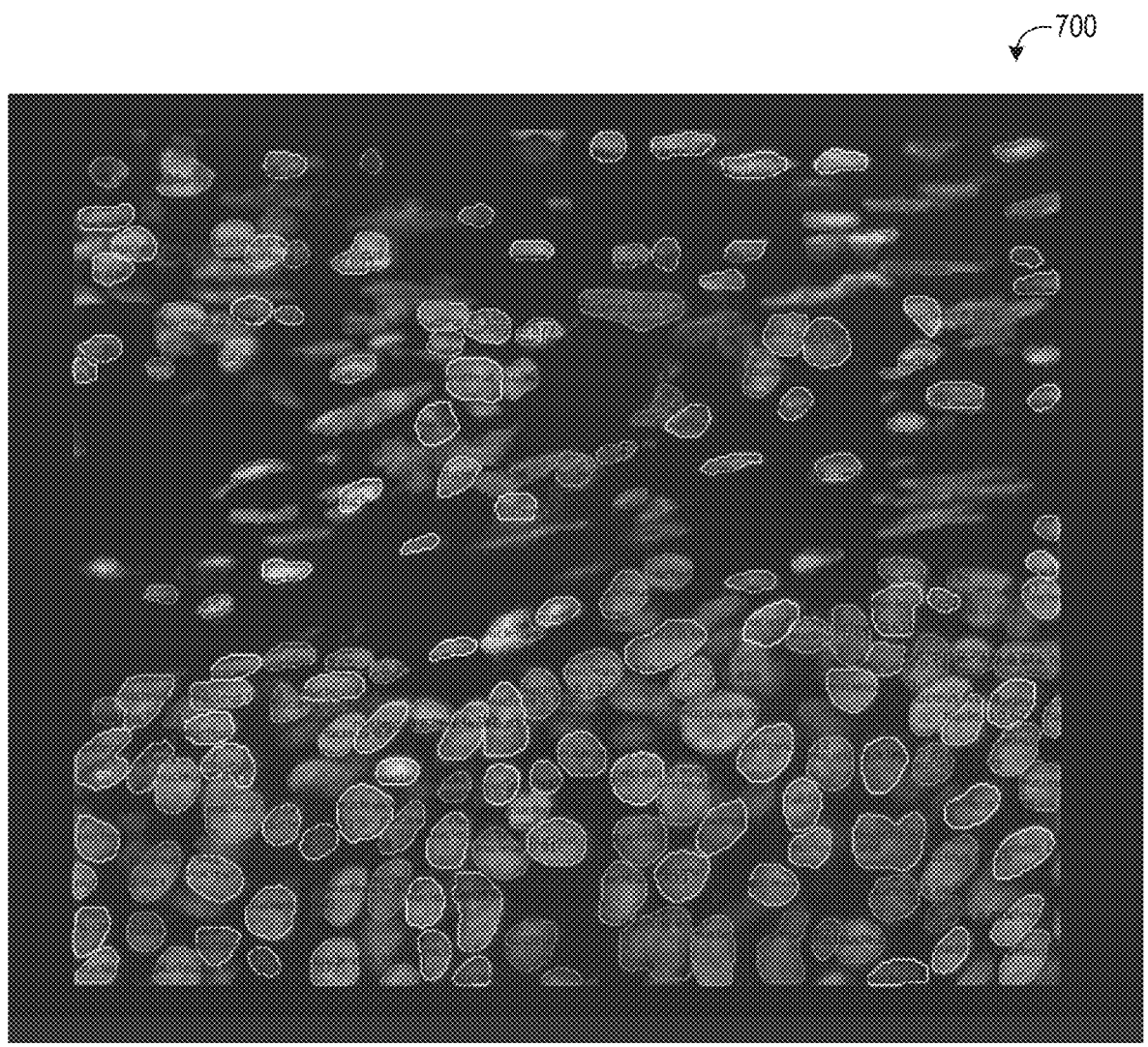
FIG. 7 illustrates an example image of nuclei segmented from the IF image of FIG. 5 according to information from the DAPI-only image of FIG. 6.

Returning to FIG. 3, generating a training dataset includes, at 306, segmenting the nuclei of the IF image based on signal intensity and nuclei morphology in the DAPI channel (e.g., the emission wavelength range of DAPI, which is around 461 nm). To accomplish this, only the signal from the DAPI channel may be analyzed (e.g., so that all other light outside of the DAPI range is filtered out), which may result in an image similar to DAPI image 600 of FIG. 6. For example, DAPI image 600 may be produced by applying a blue filter of the IF imaging device to the emitted and/or received light while imaging the stained biological sample described above with respect to FIG. 5, so that only the DAPI stain (and hence the nuclei) is visible. The nuclei may be identified as nuclei and segmented (e.g., separated from other adjacent nuclei, defining a border of each nuclei) based on the DAPI signal intensity, nuclei morphology, and/or other visual features of the nuclei visible in the image (e.g. texture). In some examples, the nuclei may be identified/segmented using a segmentation model, which may be a deep learning model that is trained using labeled nuclei from other DAPI-stained images. In such examples, the DAPI image (e.g., DAPI image 600) may be entered into the segmentation model, and the segmentation model may output an indication of the segmented nuclei (e.g., with each nuclei in the image identified via pixel coordinates). In other examples, the nuclei may be segmented using image processing techniques such as edge detection. For example, an image from an H&E stained sample may undergo color deconvolution to separate the hematoxylin signal for segmentation. If the image is instead an immunofluorescent image, then an appropriate DAPI channel is chosen. The image may then be smoothed by either blurring the image or applying a top-hat transform or other morphology filter to reduce the noise. Then a marker-based watershed segmentation algorithm may be applied with markers at the local minima of the image. The output of the final stage may be filtered to remove false positives by examining different morphological characteristics such as removing any cells longer than 21 microns or with a circularity less than 0.7. FIG. 7 shows an example image 700 of segmented nuclei. As shown in FIG. 7, each identified nucleus is defined with a border, and thus all pixels within a given border are determined to be representative of a segmented nucleus. Further, the size (e.g., diameter or longest dimension) of each nucleus may be determined.

Generating a training dataset further includes, at 308, extracting a plurality of cells based on the dimensions of the identified/segmented nuclei. For example, each nuclei identified above may be associated with a cell that is represented by a box around that nucleus (e.g., 64 by 64 pixels). In some examples, each box may be cropped/extracted out of the original IF image, such that the original IF image is cropped into a plurality of separate images, each image including an identified cell. In other examples, the original IF image may be maintained, but image data that is outside of any extracted cell may be disregarded for the purposes of the classification described below. In such examples, each cell may be defined via pixel coordinates.

Once the cells in the image have been identified, each identified cell is classified based on the signals from the non-DAPI IF channels, as indicated at 310. For example, the signal intensity of each fluorophore for each identified cell may be determined and compared to a respective threshold, and each cell may be determined as either expressing or not expressing the associated biomarker based the fluorophore signal intensity relative to the threshold. Additional details about classifying each cell is presented below with respect to FIG. 4.

Figure 9:
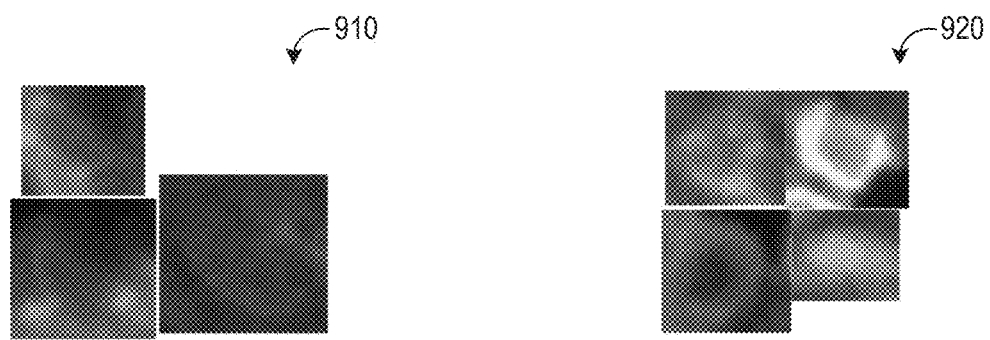
FIG. 9 shows example cells from an IF image that have been classified according to the method of FIG. 4.

At 312, each extracted cell is associated with a respective classification for that cell as determined at 310. For example, if a cell exhibits a first biomarker signature that includes expression of Ki67, CK7, CK20, and TP53, the cell may be classified as a tumor cell, while if a cell exhibits a second biomarker signature that does not include expression of these biomarkers, the cell may be classified as a normal cell. The IF image of each cell may be labeled with annotations indicating the classification of each cell (e.g., the classification may be included in the image metadata or other suitable location). In other examples, the classification of each cell may be stored in a table, with each identified cell defined by pixel coordinates or other suitable location identifier. FIG. 9 shows example cells from an IF image (e.g., IF image 500 of FIG. 5) that have been extracted from the original IF image and automatically classified as normal cells (normal cell IF images 910) and as tumor cells (tumor cell IF images 920) based on the expression levels of the biomarkers of interest. Functional subsets of cells within a specific cell lineage may be further characterized by specific and more complex biomarkers patterns. For example, proliferating compartments in the epidermis may be identified via co-expression of specific keratins and Ki67, and serve as the basis for the training of a deep learning model (e.g., a convolutional neural network) based quantification of the epithelial proliferation, with non-proliferating compartments instead characterized by a keratin-positive and Ki67-negative phenotype.

At 314, each cell IF image is converted to a pseudo H&E image. Each cell IF image may be converted to the pseudo H&E image via a re-colorization process that utilizes the information in the IF image (e.g., the shape and position of the nuclei based on the DAPI channel and signal intensity levels of the probed biomarkers) to create a respective image of each of the cells and extracellular fluid/structures in the IF image that mimics a standard H&E image. The labeling of the cell IF image is retained, such that if the IF image includes annotations or metadata indicating the classification of the cell in the image, the pseudo H&E image also includes annotations or metadata indicating the classification of that cell. In examples where the classifications of the cells in the IF image are stored in a table or other data structure (and not present on the IF image itself), the stored classifications will correspond to the classifications of the cells of the pseudo H&E image since the cells are the same in both images (e.g., same locations, same sizes, same shapes, etc.). In some examples, creating a pseudo H&E image may include modelling the intensity of a color channel $I_c$ as an exponential equation: $I_c = \exp(D_{DAPI}^c I_{DAPI}^I - D_{AF}^c I_{AF})$ where $D_{DAPI}^c$, $D_{AF}^c$ are the optical densities for a given color channel c and $I_{DAPI}$, $I_{AF}$ are the signal (pixel) intensities of DAPI and autofluorescence images. Given a set of registered H&E and DAPI images, values for $D_{DAPI}^c$ and $D_{AF}^c$ may be estimated using a set of linear equations. In some examples, creating a pseudo H&E image may include utilizing a convolutional neural network on a set of co-registered multiplex images that translates images from one domain into another. Models to accomplish this include U-NET with an additional deconvolutional layer attached.

Figure 10:
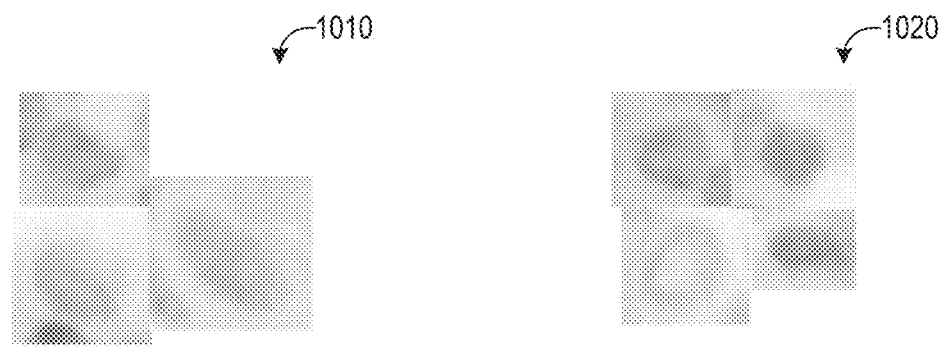
FIG. 10 shows example pseudo stained cells corresponding to the cells from the IF image of FIG. 9.

FIG. 10 shows the images of the cells from FIG. 9 converted to pseudo H&E images. Thus, the images include normal cell H&E images 1010 and tumor cell H&E images 1020.

The above process is then repeated on a plurality of remaining IF images, as indicated at 316. For example, for each remaining IF image, the nuclei in the IF image are segmented based on the signal intensity and nuclei morphology in the DAPI channel, the corresponding cells are extracted based on nuclei dimensions, each cell is classified automatically based on the signal intensity for each non-DAPI IF channel at each cell, each extracted cell IF image is labeled based on the determined cell classifications, and each labeled IF image is converted to a pseudo H&E image. The process may be repeated until a threshold number of training datasets have been generated, such as 200 or 500 datasets.

At 318, the classification model is trained with the generated training datasets. As described above, the training datasets may include a plurality of input/output data pairs with the input data including the pseudo H&E image and output data including the corresponding classification of each identified cell. To train the classification model, the pairs of input/output data are supplied to the classification model, such that the pseudo H&E images are entered as input to the classification model and the classification of each identified cell of each H&E image are entered as the training output for the classification model (e.g., the ground truth). The classification model may utilize a suitable AI algorithm, such as random forest, artificial neural networks, or other AI algorithm. For example, the classification model may utilize InceptionV3, ResNet, AlexNet, MXNet, or VGG19. Each model may be initialized with a random set of weights or pretrained on an external data set such as from ImageNet or the Camelyon16/Camelyon17 challenge. For example, if the classification model utilizes a random forest learning algorithm, the classification model may include decision trees. In another example, if the classification model utilizes artificial neural networks, the classification model may include layers of connected artificial neurons.

The connections, weights, layers, etc., of the above algorithms may be formed/selected based on the training datasets, such that the classification model, once deployed, is configured to automatically classify the cells in H&E images.

Figure 11:
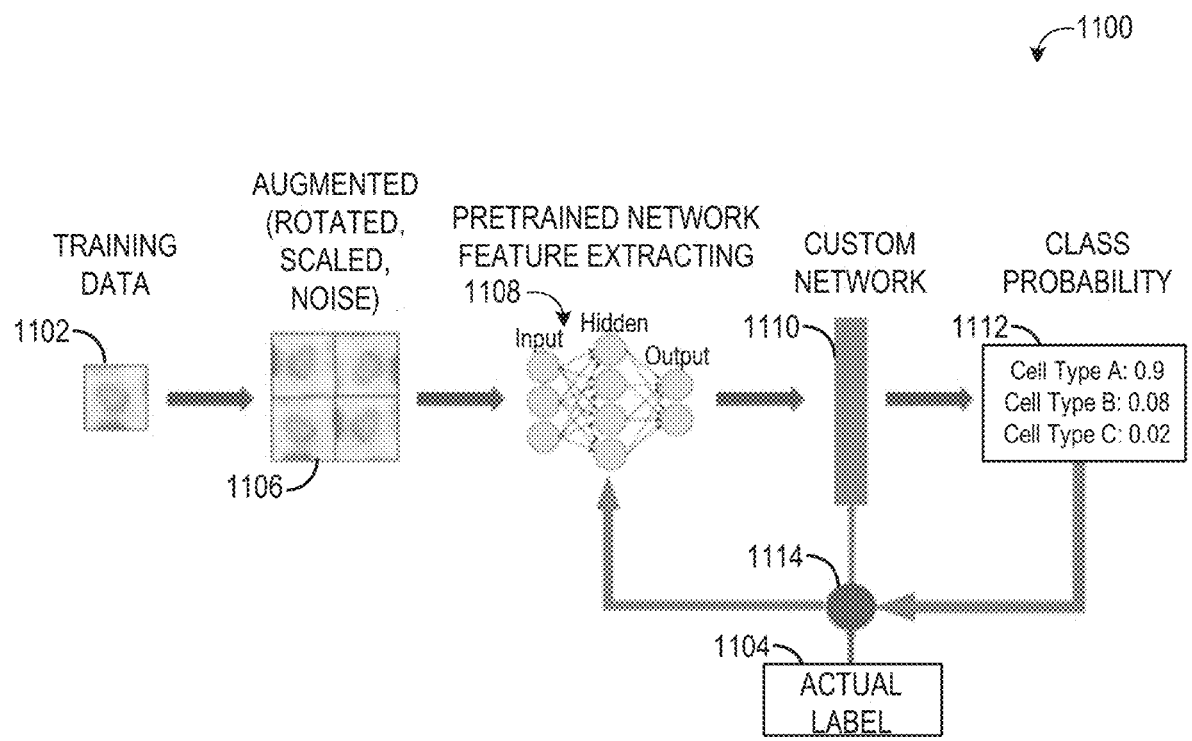
FIG. 11 shows an example process for training a classification model.

FIG. 11 shows an example process 1100 for training the classification model. The training data that is used to train the classification model includes a pseudo H&E image 1102 of a cell and a corresponding label 1104 for the cell included in the pseudo H&E image 1102. The label 1104 may be determined according to the method 300 described above, e.g., based on a biomarker signature as determined from an IF image of the cell. In process 1100, images of individual cell are supplied to train the model, though it should be appreciated that in some examples, images with more than one full cell may be used to train the model. Image 1102 is augmented through rotation, scaling, flipping, translations, cropping, adding Gaussian noise, and/or other augmentations to generate a set of augmented images 1106 each representing the cell in image 1102, and the set of augmented images 1106 is fed through a pre-trained network 1108 that acts as a feature extractor. Additional augmentation methods include affine, contrast, hue, and saturation transformations; color normalization; frequency transforms (such as blurring or sharpening of the image); and/or combinations thereof. Network 1108 may extract various features from the set of augmented images 1106, such as cell dimensions, color distribution, cell morphology, and other features. These extracted features are then classified using a smaller custom network 1110. Network 1110 outputs one or more class probabilities 1112. The class probabilities may indicate a predicted likelihood that the cell in the set of augmented images 1106 is a first cell type (Cell Type A), a second cell type (Cell Type B), a third cell type (Cell Type C), and/or additional cell types. The class probabilities 1112 are output to a comparator 1114 that compares the class probabilities 1112 to the actual label 1104 and the result is used to fine tune each network (e.g., the result from comparator 1114 is fed to both network 1108 and network 1110).

At 320, method 300 optionally includes updating the classification model if feedback is received. As explained above with respect to FIG. 2, when the classification model is deployed to automatically classify cells in an H&E or other stained image, a user (such as a pathologist) may analyze the output from the classification model and note any misclassified cells, any unidentified cells, or other errors, which may be stored as feedback for the classification model. Once a threshold level of feedback has been received, the feedback may be sent to the computing device configured to train the classification model (e.g., the classification assistant 102), and the feedback may be used to re-train the classification model. As one non-limiting example, if the classification model is initially trained to give nucleus diameter a first weight/significance in classifying a cell as cancerous, the first weight/significance may be increased or decreased if feedback is received that indicates nucleus diameter is a stronger predictor or a weaker predictor, respectively, of a cancerous cell than the classification model was initially trained to predict.

Figure 4:
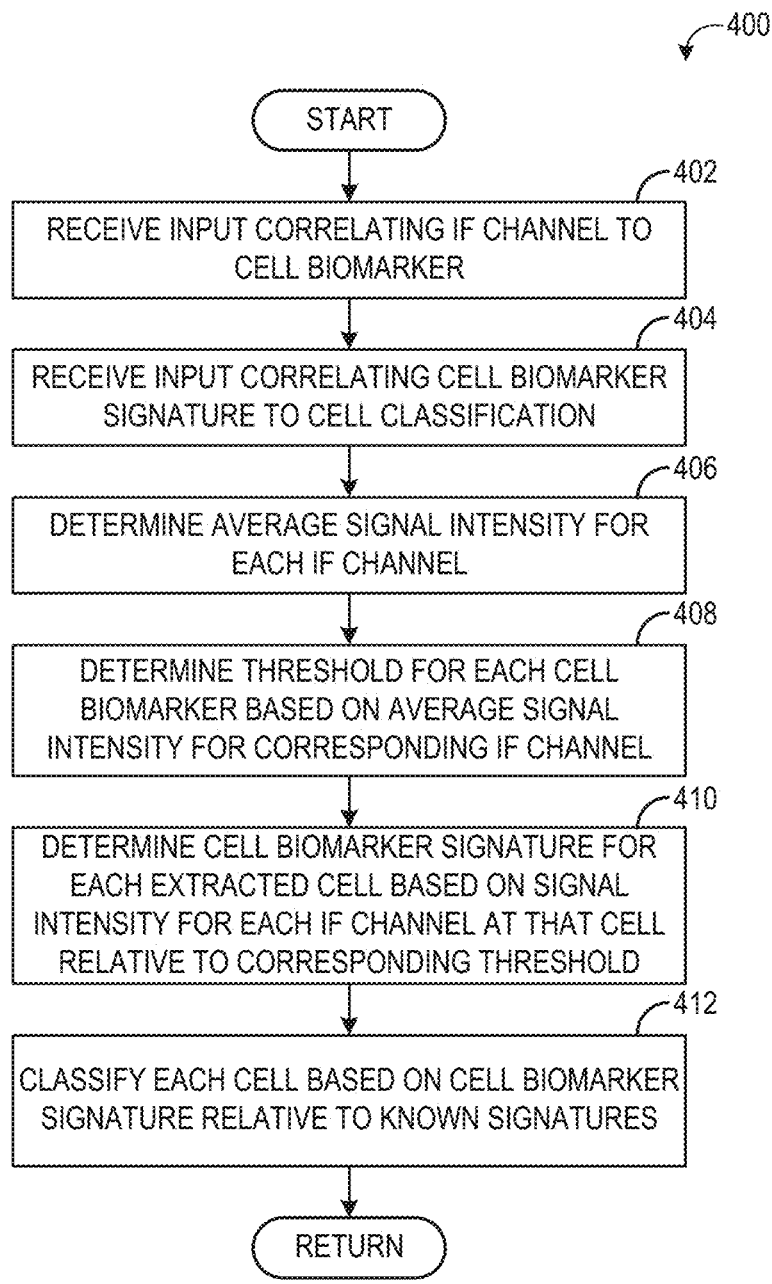
FIG. 4 is a flow chart illustrating an example method for automatically classifying cells in an immunofluorescent (IF) image.

FIG. 4 is a flow chart illustrating a method 400 for automatically classifying cells in an IF image, where the automatic classification of the cells is used to generate training data to train the classification model. Method 400 may be executed by a processor of a computing device, such as classification assistant 102 of FIG. 1, according to instructions stored in non-transitory memory of the computing device. In some examples, method 400 may be carried out as part of method 300, e.g., in order to automatically classify the cells in the IF images that are used by method 300 to generate the training datasets used to train the classification model.

At 402, input is received correlating each IF channel (or fluorophore color/emission wavelength range) to a cell biomarker. The input may be entered by a user via a suitable user input device. For example, the input may indicate that a first biomarker (e.g., CD8) may be tagged with a first fluorophore (e.g., with an emission wavelength of 690 nm), a second biomarker (e.g., CD25) may be tagged with a second fluorophore (e.g., with an emission wavelength of 650 nm), and so forth. At 404, input is received correlating each cell biomarker signature to a cell classification. As explained earlier, the cells in the IF images may be classified according to the biomarker signature exhibited by each cell. The biomarker signature may be determined based on which fluorophores are detected at or above a threshold level of signal intensity and which biomarkers are detected at below the threshold level of signal intensity. As an example, a tumor cell may be identified if a biomarker signature of Ki67, CK7, CK0, and TP53 is detected and a non-tumor cell may be identified if a biomarker signature of that lacks one or more or all of these biomarkers is detected. In another example, a cytotoxic T cell may be identified if a biomarker signature of CD8, CD25, CD45, and CD69 is detected, while a B cell may be detected if a biomarker signature of CD19, CD20, BCR, and IgM is detected.

In some examples, the input correlating IF channel/fluorophore color and biomarker and/or the input correlating biomarker signature and cell classification may be received each time an IF image is automatically classified. In other examples, the input correlating IF channel/fluorophore color and biomarker and/or the input correlating biomarker signature and cell classification may be received one time and stored in memory, and the correlation(s) may be retrieved each time an IF image is automatically classified.

Table 1, below, shows an exemplary subset of the possible biomarkers and corresponding cell classifications that may be used in the classification model to automatically classify cells. In addition, the approach described herein may be extended beyond oncology into other medical fields such as neurology or cardiology.

TABLE 1

List of Biomarkers and Associated Cell Types

| Biomarker | Cell Type |
| --- | --- |
| Ki67, CK7, CK20, TP53 | Tumor cells |
| B7, CD3, CD4, CD28, CD45 | Helper T cells |
| CD8, CD45, CD25, CD69 | Cytotoxic T cells |
| CD4, CD25, FoxP3, CD127 | Regulatory T cells |
| CD19, CD20, BCR, IgM | B cells |
| CD38, CD138 | Plasma cells |
| CD31, CD34 | Endothelial cells |
| CD15, CD16 | Neutrophils |
| CD235a | Red Blood cells |
| CD86, CD68, CD163 | Macrophages |
| GFAP | Glial cells |
| SMA, P63 | Perycites |
| MELAN-A, Mitf-2, HMB45, S100 | Melanocytes |
| CD16, CD56, CD57, CD3 (—) | Natural Killer cells |
| DiI, CD11b, CD11c, CD21, CD23 | Dendritic cells |
| STRO-1, CD29, CD44, CD73 | Mesenchymal stem cells |

(—) Indicates Absence of Biomarker in Corresponding Cell Type

At 406, an average signal intensity for each IF channel of an IF image of a cell is determined. The average signal intensity for an IF channel may be determined by obtaining the signal intensity level (e.g., brightness value) for that IF channel (which corresponds to the wavelength range of emitted light) for each pixel of each cell IF image (e.g., for each cell IF image extracted from the original IF image), and averaging the signal intensity values for the pixels in a given cell IF image (such that each cell IF image has an average signal intensity value for each IF channel). The average signal intensity values for all cell IF images (for a given IF channel) are then averaged to determine the overall average signal intensity value. In some examples, when acquiring the IF image, the IF imaging device may be configured to generate signal intensity data for each IF channel, or the computing device performing the automatic classification (e.g., classification assistant 102) may be configured to determine the signal intensity data based on the IF image. At 408, a respective threshold for each cell biomarker is determined based on the overall average signal intensity determined for that IF channel (e.g., for the IF channel corresponding to that biomarker). In some examples, each threshold emission level may be set as the overall average signal intensity for that IF channel.

Figure 8:
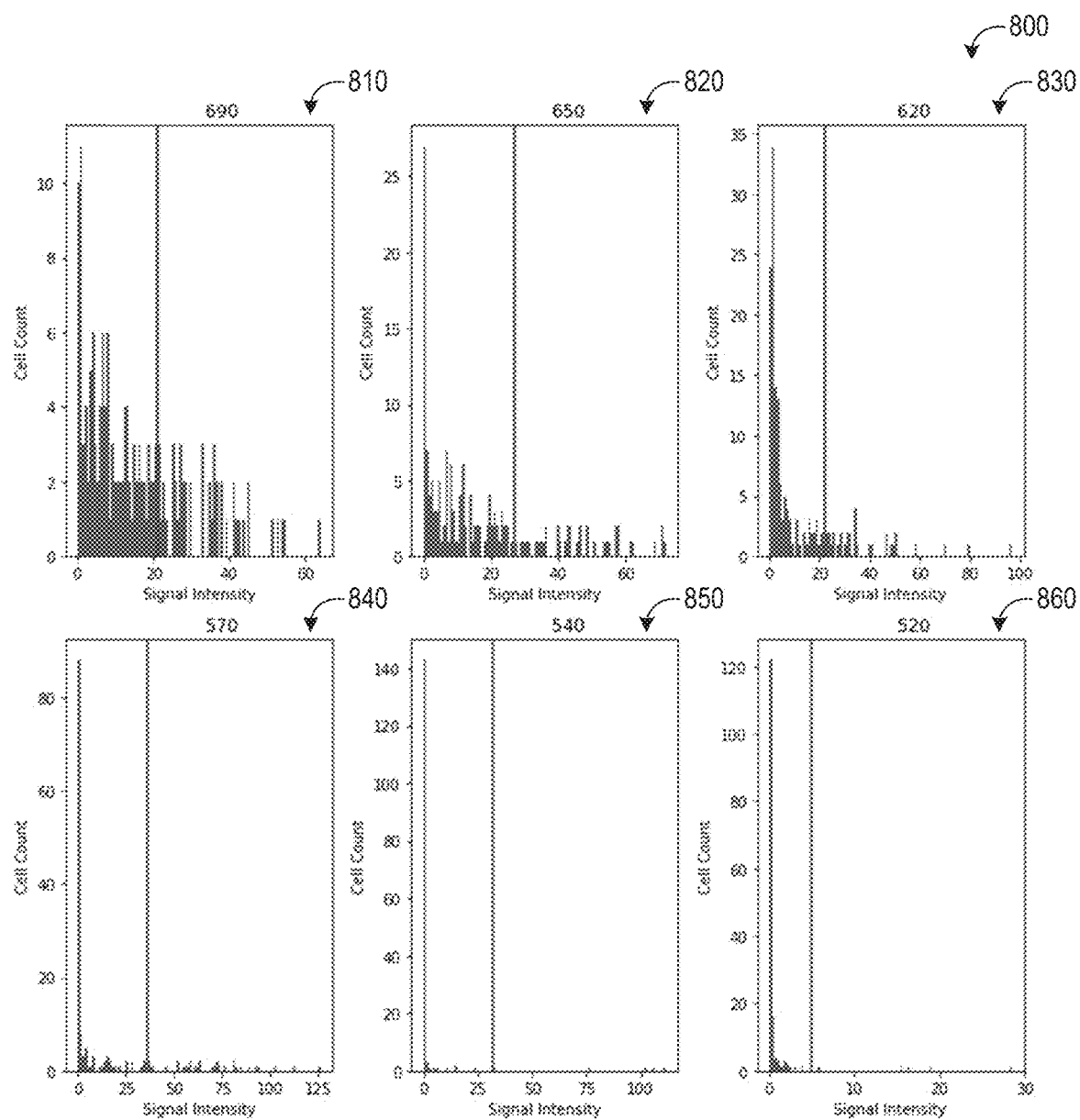
FIG. 8 shows a set of plots of example signal intensity values obtained from an IF image of the biological sample of FIG. 6.

FIG. 8 shows an example set of plots 800 of signal intensity values for a plurality of IF channels obtained from an example IF image, such as IF image 500. The set of plots 800 includes plots of signal intensity values for six IF channels: a first plot 810 of signal intensity values for a first IF channel of 690 nm, a second plot 820 of signal intensity values for a second IF channel of 650 nm, a third plot 830 of signal intensity values for a third IF channel of 620 nm, a fourth plot 840 of signal intensity values for a fourth IF channel of 570 nm, a fifth plot 850 of signal intensity values for a fifth IF channel of 540 nm, and a sixth plot 860 of signal intensity values for a sixth IF channel 860 of 520 nm. Each plot depicts signal intensity (which may be pixel brightness values on a scale from zero to 255, with zero being a darkest/least bright signal and 255 being a lightest/most bright signal) along the x-axis and a cell count (e.g., a number of extracted cells) on the y-axis. For each plot, a respective average signal intensity is shown by a red line.

Referring to first plot 810, the biomarker tagged with the 690 nm fluorophore exhibits a relatively widespread expression, with a majority of assessed cells expressing the biomarker at a detectable level. The highest signal intensity plotted in first plot 810 is approximately 65 and the average signal intensity value, and hence threshold level for the biomarker, is 20. Thus, during the execution of method 400, the signal intensity of the 690 nm fluorophore at each cell may be compared to the threshold signal intensity value (e.g., of 20) to determine if each cell is expressing the biomarker tagged by the 690 nm fluorophore.

Similarly, second plot 820 shows that the biomarker tagged with the 650 nm fluorophore exhibits widespread expression, with an average signal intensity value of approximately 27 and a maximum signal intensity value of approximately 70. Third plot 830 shows that the biomarker tagged with the 620 nm fluorophore exhibits a lower level of expression, with the majority of assessed cells either not expressing the biomarker at a detectable level or expressing the biomarker at a relatively low level (e.g., at 20 or less, with a maximum signal intensity of nearly 100). The average signal intensity value for plot 830 is approximately 20.

The biomarkers tagged with the 570, 540, and 520 nm fluorophores all show relatively low expression levels, with most assessed cells not expressing detectable levels of the biomarkers. For the fourth plot 840, the average signal intensity value is approximately 35 with some cells exhibiting signal intensity levels greater than 35 and on up to a maximum of 125. For the fifth plot 850, the average signal intensity value is approximately 30, with only a handful of cells above the average (however, most of these cells exhibit very high expression levels of over 100). For the sixth plot 860, the average signal intensity value is approximately 5, with a small number of cells exhibiting signal intensity values over 5 (and a maximum signal intensity value of less than 30).

As appreciated by the set of plots 800, different biomarkers may have very different expression levels and the different fluorophores may have relatively high signal intensity or relatively low signal intensity depending on which biomarker the fluorophore is tagging. By setting the threshold for each biomarker separately, the expression level of each biomarker may be more accurately assessed.

Returning to FIG. 4, at 410, a cell biomarker signature is determined for each extracted cell based on the signal intensity for each IF channel at the cell relative to the corresponding threshold. For example, and referring to the set of plots 800 of FIG. 8, the biomarker CD8 may be tagged with the 690 nm fluorophore, and thus a cell may be determined to be CD8+ if the cell has a signal intensity value for the 690 nm channel that is equal to or greater than 20 and may be determined to be CD8− if the cell has a signal intensity value for the 690 nm channel that is less than 20; the biomarker CD25 may be tagged with the 650 nm fluorophore, and thus a cell may be determined to be CD25+ if the cell has a signal intensity value for the 650 nm channel that is equal to or greater than 27 and may be determined to CD25− if the cell has a signal intensity value for the 650 nm channel that is less than 27. A similar approach may be taken for each biomarker, resulting in a cell signature that denotes whether the cell is positive or negative for each assessed biomarker.

At 412, each cell is classified based on the cell biomarker signature relative to known signatures. For example, the known signatures may include one or more biomarker signatures that indicate a cell is cancerous and one or more biomarker signatures that indicate a cell is non-cancerous; the known cell signatures may additionally or alternatively include one or more biomarker signatures that indicate cell type (e.g., cytotoxic T cell, macrophage, B cell). Thus, to classify a cell, the cell biomarker signature determined at 410 may be compared to each known signature and classified based on whether or not the cell biomarker signature matches a known signature.

In this way, each identified cell of an IF image may be automatically classified into one or more selected classifications based on a cell biomarker signature that is automatically determined from expression levels of the biomarkers, as determined by signal intensity values for each of a plurality of fluorophores. Once each identified cell has been classified, the IF image of that cell may be converted to a pseudo histological stained image, where the pseudo histological stained image resembles a traditional histological stained image, such as an H&E image. A plurality of pseudo histological stained images may be generated from a plurality of IF images, where each identified cell in each IF image is classified as described above. The pseudo stained images and corresponding cell classifications may be used to train a classification model, which may then be deployed to automatically classify cells in a traditional histological stained image. By doing so, hospitals, clinics, and diagnostic facilities that lack the capabilities and equipment to perform more advanced imaging modalities (e.g., immunofluorescence imaging) may utilize the classification model to perform automatic cell classification on traditional histological stained images.

Figure 13:
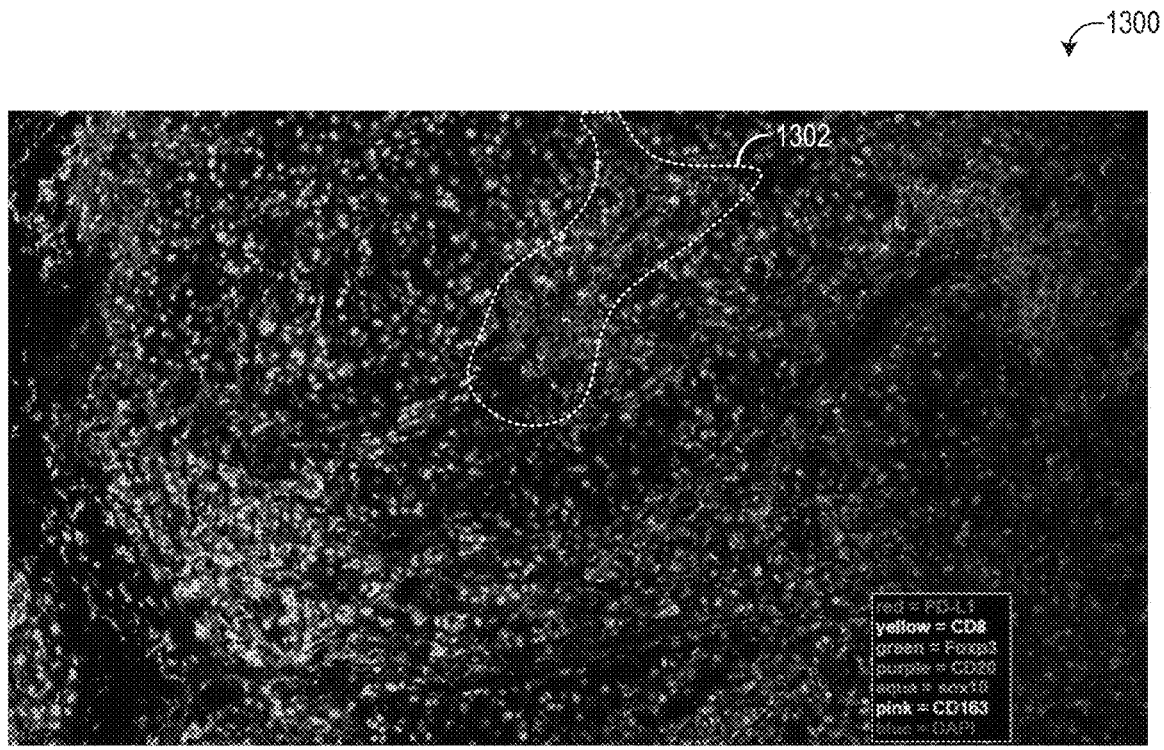
FIG. 13 shows another example IF image of a biological sample.
Figure 14:
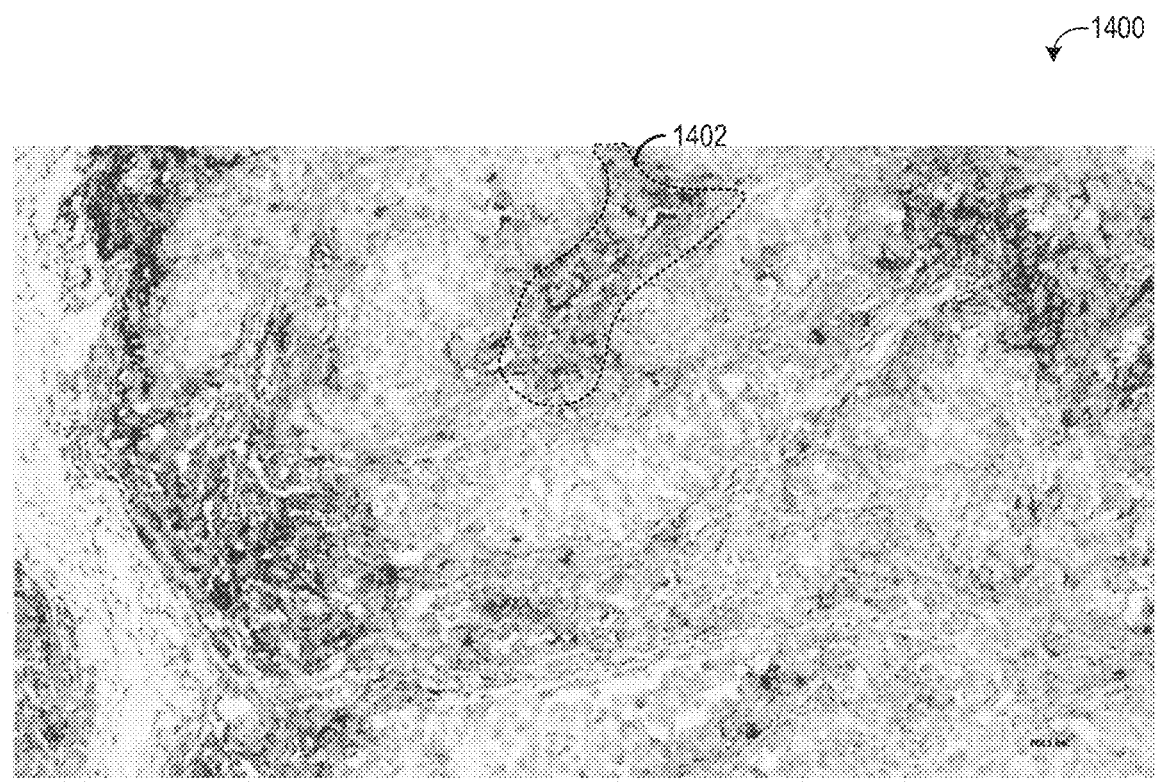
FIG. 14 shows a pseudo histological stained image of the IF image of FIG. 13.
Figure 15:
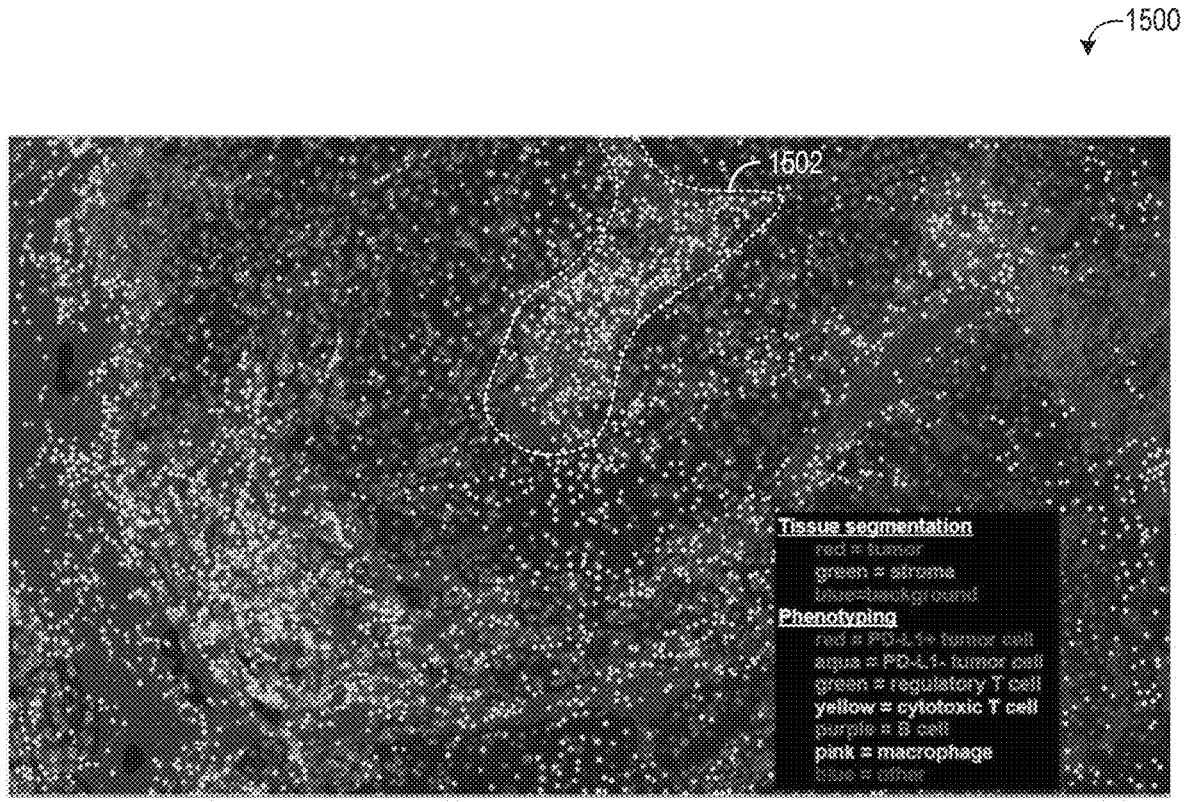
FIG. 15 shows an example segmented image that may be generated using information from the IF image of FIG. 13, showing segmented tissue types and identified cell types.

FIGS. 13-15 show an additional example set of images that may be used to train a classification model. FIG. 13 shows an example IF image 1300 of a section of a biological sample tagged with a plurality of fluorophores. IF image 1300 shows expression levels and distribution of different biomarkers of interest, due to the different biomarkers being tagged with different fluorophores. In IF image 1300, PD-L1 is shown in red, CD8 is shown in yellow, Foxp3 is shown in green, CD20 is shown in purple, Sox10 is shown in aqua, and CD163 is shown in pink. Further, the cell nuclei have been stained with DAPI. FIG. 14 shows an example pseudo histological stained image 1400 (referred to as pseudo image 1400) generated from IF image 1300. Specifically, pseudo image 1400 is a pseudo H&E/DAB image generated by recoloring/processing IF image 1300 as explained above to generate a pseudo H&E image, and then further processing IF image 1300 so that PD-L1 is pseudo tagged with 3,3'-Diaminobenzidine (DAB). As a result, and as appreciated by comparing IF image 1300 to pseudo image 1400, PD-L1 is tagged with red in IF image 1300 and also tagged with red in pseudo image 1400.

The expression levels of the different biomarkers tagged in IF image 1300 may be used to segment the section of the biological sample into different tissue types as well as different cell types. For example, the cell classification process explained above with respect to FIG. 4 may be applied to IF image 1300 in order to identify the cell type of each identified cell in IF image 1300. Further, different tissue types in IF image 1300 may be identified based on the expression levels of the biomarkers discussed above. FIG. 15 shows an example segmented image 1500 that may be generated via the methods discussed above (e.g., method 400 of FIG. 4), where the expression levels of the biomarkers visualized in IF image 1300 are used to segment the biological sample by tissue type and cell type. In segmented image 1500, the biological sample is segmented into tumor tissue and stroma tissue, with the tumor tissue represented with the red background color and the stroma represented by the green background color (background/non-identified tissue is shown in blue). For example, tumor tissue may be identified based on expression levels of Sox10, Foxp3, and PD-L1 (e.g., cells may be identified as tumor cells when Sox10, PD-L1, and/or Foxp3 are expressed) while stroma may be identified based on lack of expression of Sox10, Foxp3, and/or PD-L1 and/or expression of CD163.

The cells in segmented image 1500 are also classified by cell type, based on the expression levels of the different biomarkers. Each classified cell is represented by a colored circle at a position that corresponds to the position of that cell in the IF image 1300 of FIG. 13. As shown, PD-L1 positive tumor cells are shown in red, PD-L1 negative tumor cells are shown in aqua, regulatory T cells are shown in green, cytotoxic T cells are shown in yellow, B cells are shown in purple, and macrophages are shown in pink (all other cell types are shown in blue).

Segmented image 1500 includes a region 1502 that is highlighted for illustrative purposes (a boundary of region 1502 is shown by the dotted white line). Region 1502 has been classified as stroma tissue and includes a relatively high density of cytotoxic T cells, as well as a cluster of B cells and some macrophages. In the areas around region 1502, the tissue is classified as tumor tissue and the cells are primarily PD-L1 positive tumor cells or PD-L1 negative tumor cells.

Image regions corresponding to region 1502 are also visible in IF image 1300 of FIG. 13 and pseudo image 1400 of FIG. 14. For example, IF image 1300 includes region 1302 and pseudo image 1400 includes region 1402. As will be appreciated in region 1302, a lack of cells expressing Sox10 is found in region 1302 relative to neighboring areas, and CD20 is expressed at a relatively higher amount in region 1302 than in neighboring areas. These differences in biomarker expression, used to classify tissue type and cell type, also manifest in visible differences present in pseudo image 1400. For example, region 1402 includes a higher density of red staining than neighboring areas, as well as darker blue staining than in neighboring areas. Thus, segmented image 1500 and pseudo image 1400 may be an input-output pair of images used to train a classification model to identify cell type and tissue type in a histological stained image.

EXAMPLES

Example I

Immunofluorescent Staining of Tissue Samples

To generate the immunofluorescent images usable to train a classification model, slides were prepared by sectioning tissue and mounting the sections on microscope slides. The slides were baked at 60° C. for one hour, deparaffinized with a xylene wash (3× ten minutes), and rehydrated with an ethanol gradient into deionized water. The slides were fixed with 10% NBF for 20 minutes followed by a wash with deionized water. To retrieve antigens in the cells on the slides, the slides were treated with AR6 or AR9 buffer and microwaved, then cooled to room temperature for at least 15 minutes. The antigens were blocked by rinsing the slides with deionized water and TBST, a PAP pen barrier was applied to define borders around regions to be stained where indicated, and the slides were incubated for 10 minutes in a blocking solution at room temperature. The blocker was removed and a first primary antibody was applied. After incubation with the first primary antibody, the slides were rinsed with TBST and washed in TBST (3×2 minutes). The slides were incubated with a secondary antibody for 10 minutes at room temperature, rinsed with TBST, and washed with TBST (3×2 minutes). The slides were incubated with a first fluorophore for ten minutes at room temperature, rinsed with TBST, and washed with TBST (3×2 minutes). The slides then underwent a denaturation treatment where the slides were rinsed with AR6 or AR9 buffer, microwaved, and cooled for at least 15 minutes. The process above was repeated for each additional primary antibody/fluorophore pair, where an additional primary antibody was incubated then rinsed, secondary antibody was incubated then rinsed, an additional fluorophore was incubated then rinsed, and a denaturation treatment was administered. Following denaturation after the final primary antibody/fluorophore pair was applied, the slides were rinsed in deionized water and then TBST. The slides were incubated with DAPI for 5 minutes at room temperature, washed with deionized water and TBST (2 minutes each). Mounting medium was applied for fluorescence microscopy and coverslips were added. The slides were imaged using a fluorescent microscope. In addition to outputting digital images of the tissue on the slides, the microscope also outputted signal intensity information for each channel (the DAPI channel and each fluorophore).

Example II

H&E Slide Preparation

H&E stained slides usable to generate digital images to enter into a classification model were created by sectioning tissue and mounting the sections on microscope slides. The slides were rinsed with deionized water and stained with hematoxylin for four minutes at room temperature. The slides were then rinsed with tap water and differentiated with 0.3% acid alcohol. The slides were rinsed in tap water and then Scott's tap water substitute. The slides were then stained with eosin for two minutes at room temperature. The slides were then dehydrated, cleared, and mounted for imaging. The slides were imaged with a bright field microscope that outputted digital images of the stained tissue at suitable magnification.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

The invention claimed is:

1. A method, comprising:
   automatically classifying a plurality of cells in an image of a biological sample stained with hematoxylin and eosin (H&E) using a classification model, the classification model trained with a plurality of automatically-classified pseudo stained images, each pseudo stained image generated from a respective immunofluorescent image recolored to resemble a labeled H&E stained image.

2. The method of claim 1, wherein the classifying includes entering the image into the classification model, the classification model configured to output a labeled version of the image where each classified cell in the image is labeled with a respective classification determined by the classification model.

3. The method of claim 2, further comprising outputting the labeled version of the image for display and/or storage.

4. The method of claim 1, wherein the classifying includes identifying, via the classification model, the plurality of cells in the image and classifying, via the classification model, each identified cell as either a non-tumor cell or a tumor cell.

5. The method of claim 1, wherein the classifying includes identifying, via the classification model, the plurality of cells in the image and classifying, via the classification model, one or more identified cells as a regulatory T cell, a cytotoxic T cell, a B cell, or a macrophage.

6. The method of claim 1, wherein the classifying includes assigning each cell of the plurality of cells to an identified tissue type.

7. The method of claim 1, wherein the immunofluorescent image is a multiplexed image.

8. A method, comprising:
   training a classification model to automatically classify each of a first plurality of cells in an image of a biological sample stained with a histological stain, the training including:
   obtaining a plurality of immunofluorescent (IF) images, each IF image including a cell labeled with one or more fluorophores, each fluorophore configured to tag, via a respective primary antibody, a respective target biomarker;
   automatically classifying each cell in the plurality of IF images based on a biomarker signature exhibited by each cell as determined based on a signal intensity level for each fluorophore of each cell;
   recoloring each IF image to a labeled pseudo hematoxylin and eosin stained image to thereby generate a plurality of pseudo stained images; and
   training the classification model with the plurality of pseudo hematoxylin and eosin stained images and associated cell classifications.

9. The method of claim 8, wherein obtaining the plurality of IF images comprises:
   obtaining an original IF image including a second plurality of cells, each cell of the second plurality of cells labeled with DAPI,
   identifying each cell of the second plurality of cells in the original IF image based on one or more of a DAPI signal intensity, nucleus size, and nucleus shape, where the nucleus size and nucleus shape are determined from the DAPI labeling, and
   extracting each identified cell into a respective separate IF image to form the plurality of IF images.

10. The method of claim 9, wherein automatically classifying each cell based on a biomarker signature exhibited by each cell of the second plurality of cells comprises:
    automatically classifying each cell that exhibits a first biomarker signature as a tumor cell; and
    automatically classifying each cell that exhibits a second biomarker signature as a normal cell.

11. The method of claim 9, wherein automatically classifying each cell based on a biomarker signature exhibited by each cell of the second plurality of cells comprises:
    automatically classifying each cell that exhibits a first biomarker signature as a regulatory T cell;
    automatically classifying each cell that exhibits a second biomarker signature as a cytotoxic T cell;
    automatically classifying each cell that exhibits a third biomarker signature as a B T cell; and
    automatically classifying each cell that exhibits a fourth biomarker signature as a macrophage cell.

12. A computing device, comprising:
    a processor; and
    a memory storing instructions executable by the processor to automatically classify a plurality of cells in an image of a biological sample stained with hematoxylin and eosin (H&E) using a classification model, the classification model trained with a plurality of automatically-labeled pseudo H&E stained images each generated from a respective immunofluorescent image of a biological sample recolored to resemble a labeled H&E image.

13. The computing device of claim 12, wherein the instructions executable to classify the plurality of cells include instructions executable to enter the image into the classification model, the classification model configured to output a labeled version of the image where each classified cell in the image is labeled with a respective classification determined by the classification model.

14. The computing device of claim 13, wherein the instructions are executable to output the labeled version of the image for display and/or storage.

15. The computing device of claim 12, wherein the instructions executable to classify the plurality of cells include instructions executable to identify, via the classification model, the plurality of cells in the image and classify, via the classification model, each identified cell as either a non-tumor cell or a tumor cell.

16. The computing device of claim 12, wherein the instructions executable to classify the plurality of cells include instructions executable to identify, via the classification model, the plurality of cells in the image and classify, via the classification model, one or more identified cells as a regulatory T cell, a cytotoxic T cell, a B cell, or a macrophage.

17. The computing device of claim 12, wherein the instructions executable to classify the plurality of cells include instructions executable to assign each cell of the plurality of cells to an identified tissue type.

18. The computing device of claim 12, wherein the image is acquired with a bright field microscope and associated image capture device.

* * * * *